US012726966B2

(12) United States Patent
Sevindik et al.

(10) Patent No.: US 12,726,966 B2
(45) **Date of Patent: *Sep. 1, 2026**

(54) METHODS AND APPARATUS FOR SPECTRUM UTILIZATION COORDINATION BETWEEN WIRELINE BACKHAUL AND WIRELESS SYSTEMS

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,995

(22) Filed: Jul. 15, 2024

(65) Prior Publication Data

US 2024/0373407 A1 Nov. 7, 2024

Related U.S. Application Data

(63) Continuation of application No. 16/995,407, filed on Aug. 17, 2020, now Pat. No. 12,041,589.

(51) Int. Cl.
*H04W 72/0453* (2023.01)
*H04L 1/00* (2006.01)
(Continued)

(52) U.S. Cl.
CPC ....... *H04W 72/0453* (2013.01); *H04L 1/0042* (2013.01); *H04L 27/0002* (2013.01); *H04W 72/542* (2023.01)

(58) Field of Classification Search
CPC ............. H04W 72/04; H04W 72/0406; H04W 72/0413; H04W 72/042; H04W 72/0426;
(Continued)

(56) References Cited

U.S. PATENT DOCUMENTS 3,629,862 A 12/1971 Chow
6,177,963 B1 1/2001 Foye et al.
(Continued)

OTHER PUBLICATIONS

Banerji S., et al., "On IEEE 802.11: Wireless LAN Technology," 2013, vol. 3(4), 19 pages.
(Continued)

*Primary Examiner* — Dung B Huynh
(74) *Attorney, Agent, or Firm* — Patent Beach PC

(57) ABSTRACT

Methods and apparatus for enhancing performance of a wireline communication network backhaul for a wireless node. In one embodiment, the node comprises a small-cell or other wireless base station that is backhauled by a DOCSIS system within a managed HFC network, and the methods and apparatus enable enhanced communication between the small cell/base station and the backhaul network so as to support adaptation by the wireline network for frequencies used by the node so as to mitigate interference or other issues. In one implementation, enhanced cable modem (CM), cable modem termination system (CMTS) and node devices coordinate to inform the CMTS of use of potentially interfering frequencies by the base station so that the CMTS can monitor, and reconfigure as necessary, any affected wireline RF channels.

20 Claims, 22 Drawing Sheets

(51) Int. Cl.
*H04L 27/00* (2006.01)
*H04W 72/542* (2023.01)

(58) Field of Classification Search
CPC ........... H04W 72/0433; H04W 72/044; H04W 72/0446; H04W 72/0453; H04W 72/046; H04W 72/0466; H04W 72/0473; H04W 72/048; H04W 72/0486; H04W 72/0493; H04W 72/06; H04W 72/08; H04W 72/082; H04W 72/085; H04W 72/087; H04W 72/10; H04W 4/06; H04W 88/06; H04W 88/00; H04W 28/0866; H04W 28/0958; H04B 17/318
See application file for complete search history.

(56) References Cited

U.S. PATENT DOCUMENTS 6,185,423 B1 2/2001 Brown et al.
6,233,455 B1 * 5/2001 Ramakrishna ........ H04W 36/18 455/442
6,501,737 B1 12/2002 Mathal et al.
6,618,432 B1 * 9/2003 Ganesh ................ H04W 16/18 370/335
6,917,820 B2 7/2005 Gore et al.
7,142,812 B1 11/2006 Brankovic et al.
7,299,072 B2 * 11/2007 Ninomiya ............. H04W 16/14 455/562.1
7,379,478 B1 5/2008 Mantha
7,403,748 B1 7/2008 Keskitalo et al.
7,656,890 B2 2/2010 Chapman et al.
8,005,083 B1 8/2011 Diep
8,040,807 B2 10/2011 Pai et al.
8,041,335 B2 10/2011 Khetawat et al.
8,041,627 B2 10/2011 Stanforth et al.
8,107,430 B1 * 1/2012 Sarkar ................... H04W 72/56 370/329
8,180,355 B2 * 5/2012 Matsuzawa ........... H04W 16/30 455/562.1
9,203,639 B2 12/2015 Thibeault et al.
9,231,748 B1 1/2016 Wurtenberger et al.
9,369,992 B1 * 6/2016 Park ...................... H04L 1/0001
9,467,867 B1 10/2016 Hasegawa et al.
9,655,127 B1 5/2017 Srinivas et al.
9,712,295 B2 * 7/2017 Park ...................... H04L 5/0092
9,814,044 B1 11/2017 Sevindik
10,045,070 B2 8/2018 Markley et al.
10,432,368 B1 * 10/2019 Pawar .............. H04W 72/0446
10,575,232 B2 2/2020 Tsuda et al.
11,051,312 B1 6/2021 Marupaduga et al.
12,041,589 B2 * 7/2024 Sevindik ............. H04W 72/542
2002/0065063 A1 5/2002 Uhlik et al.
2002/0125933 A1 9/2002 Tamura et al.
2003/0027577 A1 2/2003 Brown et al.
2003/0107991 A1 6/2003 Tezuka et al.
2003/0161419 A1 8/2003 Bach et al.
2003/0189907 A1 * 10/2003 Miyamoto ............ H04W 52/34 370/320
2004/0048574 A1 3/2004 Walker et al.
2004/0085959 A1 * 5/2004 Ohkawa ................ H04L 47/745 370/252
2005/0003865 A1 * 1/2005 Lastinger .............. H04W 16/12 455/562.1
2005/0020243 A1 * 1/2005 Benco ..................... H04W 8/18 455/406
2005/0163196 A1 7/2005 Currivan et al.
2005/0220047 A1 10/2005 Baey et al.
2005/0249117 A1 11/2005 Gerkins
2007/0087772 A1 * 4/2007 Yi ....................... H04W 52/367 455/513
2007/0098120 A1 * 5/2007 Wang .................. H04L 25/0216 375/346
2007/0271588 A1 11/2007 Bunn et al.
2008/0037429 A1 2/2008 Lansing et al.
2008/0130589 A1 6/2008 Gorokhov et al.
2008/0153416 A1 6/2008 Washiro
2008/0181108 A1 7/2008 Hashmi et al.
2008/0181183 A1 * 7/2008 Gale ..................... H04W 88/10 370/336
2008/0193137 A1 * 8/2008 Thompson .......... H04L 12/2801 398/115
2008/0220047 A1 9/2008 Sawhney et al.
2009/0054020 A1 2/2009 Mason
2009/0109929 A1 * 4/2009 Quan ................ G06K 7/10356 370/332
2009/0116594 A1 * 5/2009 Abe ......................... H04B 1/28 375/346
2009/0122874 A1 5/2009 Kolze et al.
2009/0168676 A1 * 7/2009 Olson ............... H04W 52/0229 455/552.1
2009/0180490 A1 * 7/2009 Beser ................. H04N 21/6168 370/431
2009/0296611 A1 12/2009 Monk et al.
2010/0061313 A1 * 3/2010 Park ........................ H04W 4/20 370/329
2010/0117740 A1 5/2010 Hwang et al.
2010/0202336 A1 * 8/2010 Cheng ................... H04W 72/23 370/312
2010/0222003 A1 9/2010 Yoshii et al.
2010/0312892 A1 12/2010 Woundy et al.
2011/0045856 A1 2/2011 Feng et al.
2011/0090911 A1 * 4/2011 Hao .................... G06F 9/45558 370/395.53
2011/0126185 A1 * 5/2011 Waris .................. H04L 67/1044 717/169
2011/0142017 A1 6/2011 Coldren
2011/0159891 A1 * 6/2011 Segall ................... H04W 64/00 455/456.3
2011/0185263 A1 7/2011 Chapman et al.
2011/0218007 A1 * 9/2011 Kimura .............. H04W 72/541 455/512
2011/0267253 A1 11/2011 Bit-Babik et al.
2011/0268008 A1 11/2011 Kim et al.
2011/0287794 A1 11/2011 Koskela et al.
2011/0299488 A1 12/2011 Kim et al.
2011/0320631 A1 12/2011 Finkelstein
2012/0058794 A1 3/2012 Valentine
2012/0064936 A1 * 3/2012 Vrzic .................. H04W 52/367 455/522
2012/0082100 A1 4/2012 Ahmadi
2012/0151305 A1 6/2012 Zhang et al.
2012/0250526 A1 * 10/2012 Zhao .................. H04B 7/15557 370/293
2012/0317278 A1 * 12/2012 Tamaki ................. H04L 1/0018 709/224
2013/0010686 A1 * 1/2013 Shatzkamer .......... H04W 40/00 370/328
2013/0012249 A1 1/2013 Centonza et al.
2013/0021996 A1 1/2013 Wang et al.
2013/0029674 A1 * 1/2013 Arad ..................... H04W 16/02 455/447
2013/0033642 A1 2/2013 Wan et al.
2013/0036175 A1 * 2/2013 Lau ................... H04M 3/42357 709/206
2013/0072136 A1 3/2013 Besoli et al.
2013/0074138 A1 3/2013 Chapman
2013/0107793 A1 * 5/2013 Gan .................... H04W 56/001 370/315
2013/0163524 A1 6/2013 Shatzkamer et al.
2013/0165134 A1 6/2013 Touag et al.
2013/0174186 A1 7/2013 Kelsen et al.
2013/0251019 A1 9/2013 Kolze
2013/0316750 A1 11/2013 Couch
2013/0332815 A1 12/2013 Gallo et al.
2014/0010269 A1 * 1/2014 Ling ........................ H04B 3/46 375/222
2014/0056130 A1 2/2014 Grayson et al.
2014/0080422 A1 * 3/2014 Guo ......................... H04B 7/06 455/67.11

(56) References Cited

U.S. PATENT DOCUMENTS

2014/0086194 A1 3/2014 Sugahara
2014/0247743 A1 9/2014 Seo
2014/0254392 A1 9/2014 Wolcott et al.
2014/0294052 A1 10/2014 Currivan et al.
2014/0362688 A1* 12/2014 Zhang .................. H04W 24/02 370/230
2015/0016247 A1* 1/2015 Hayes .................. H04L 47/127 370/230
2015/0017999 A1 1/2015 Chen et al.
2015/0139050 A1 5/2015 Sun et al.
2015/0146712 A1 5/2015 Jin
2015/0180784 A1* 6/2015 Tokutsu .............. H04L 12/4625 370/429
2015/0215790 A1 7/2015 Davari et al.
2015/0327265 A1 11/2015 Lee et al.
2015/0334574 A1 11/2015 Krishnamoorthy et al.
2015/0350912 A1 12/2015 Head et al.
2015/0350949 A1 12/2015 Wang et al.
2015/0382199 A1 12/2015 Sun
2016/0036490 A1* 2/2016 Wu ......................... H04B 3/32 375/257
2016/0037511 A1* 2/2016 Vincze .................. H04W 72/27 370/329
2016/0080449 A1 3/2016 Nagamine et al.
2016/0088531 A1 3/2016 Rashid et al.
2016/0095007 A1* 3/2016 Tian ...................... H04L 5/0073 370/252
2016/0183230 A1 6/2016 Park et al.
2016/0198350 A1 7/2016 Lou et al.
2016/0219459 A1* 7/2016 Buddhikot ........ H04W 28/0958
2016/0282841 A1 9/2016 Ishii et al.
2016/0337926 A1* 11/2016 Batchu ................ H04W 36/302
2016/0360553 A1 12/2016 Cheng et al.
2016/0365914 A1* 12/2016 Lin ....................... H04B 15/00
2017/0005740 A1 1/2017 Yang et al.
2017/0006483 A1 1/2017 Attanasio et al.
2017/0026819 A1 1/2017 Xue et al.
2017/0086199 A1 3/2017 Zhang et al.
2017/0093555 A1 3/2017 Hamzeh et al.
2017/0150506 A1 5/2017 Mitsui et al.
2017/0214478 A1 7/2017 Chang et al.
2017/0265216 A1 9/2017 Andreoli-Fang et al.
2017/0302378 A1 10/2017 Mutalik et al.
2017/0359851 A1 12/2017 Kakinada et al.
2017/0366476 A1 12/2017 Sweeney et al.
2017/0366983 A1* 12/2017 Gunasekara ........ H04L 43/0811
2017/0374563 A1* 12/2017 Pirila .................... H04W 16/10
2018/0054740 A1 2/2018 Furuichi
2018/0070296 A1 3/2018 Srikanteswara et al.
2018/0146483 A1 5/2018 Kobayashi et al.
2018/0159584 A1* 6/2018 Zhang ....................... H04L 5/14
2018/0160433 A1 6/2018 Kim et al.
2018/0206235 A1 7/2018 Zhu et al.
2018/0242340 A1* 8/2018 Pu ..................... H04W 74/0816
2018/0252793 A1* 9/2018 Hazlewood ............... G01S 5/18
2018/0255464 A1 9/2018 Fodor et al.
2018/0270103 A1 9/2018 Chapman et al.
2018/0285086 A1* 10/2018 O'Malley ................. G06F 8/65
2018/0288621 A1 10/2018 Markwart et al.
2018/0359708 A1* 12/2018 Zhao .................. H04W 52/146
2019/0021115 A1 1/2019 Gupta et al.
2019/0028220 A1 1/2019 Kecicioglu et al.
2019/0028900 A1 1/2019 Furuichi
2019/0037418 A1* 1/2019 Gunasekara .......... H04W 52/40
2019/0037567 A1 1/2019 Zhao et al.
2019/0045534 A1 2/2019 Zaks et al.
2019/0098640 A1* 3/2019 Holakouei .......... H04W 72/542
2019/0103952 A1 4/2019 Goudal et al.
2019/0116601 A1 4/2019 Warashina
2019/0132098 A1 5/2019 Wernersson et al.
2019/0132170 A1 5/2019 Si et al.
2019/0132850 A1* 5/2019 Sun ....................... H04W 72/30
2019/0150134 A1 5/2019 Kakinada et al.
2019/0166168 A1 5/2019 Lu et al.
2019/0174542 A1* 6/2019 Lei .................... H04W 74/0808
2019/0181564 A1 6/2019 Kwon et al.
2019/0261197 A1* 8/2019 Bellamkonda ........ H04W 16/18
2019/0268916 A1 8/2019 Guo et al.
2019/0273528 A1 9/2019 Watanabe
2019/0274064 A1 9/2019 Chapman et al.
2019/0349066 A1 11/2019 Yang et al.
2019/0357232 A1* 11/2019 Raghothaman ....... H04L 5/0037
2019/0373301 A1* 12/2019 Gunasekara ....... H04N 21/6405
2019/0379421 A1 12/2019 Niakan et al.
2019/0379610 A1 12/2019 Srinivasan et al.
2019/0387413 A1 12/2019 Wong et al.
2019/0387539 A1 12/2019 Finkelstein
2019/0393898 A1* 12/2019 Kobayashi ................ H04L 1/08
2020/0022036 A1 1/2020 Lee et al.
2020/0067952 A1* 2/2020 Deaguero ............. G06F 21/552
2020/0092034 A1 3/2020 Jones
2020/0092736 A1 3/2020 Futaki et al.
2020/0120689 A1* 4/2020 Abouelseoud ........ H04W 16/28
2020/0145031 A1 5/2020 Karlsson et al.
2020/0145967 A1* 5/2020 Park ...................... H04W 72/23
2020/0187208 A1 6/2020 Hou et al.
2020/0196319 A1* 6/2020 Ram ................... H04L 25/0202
2020/0204257 A1 6/2020 Krampl et al.
2020/0252193 A1 8/2020 Finkelstein
2020/0252933 A1 8/2020 Hmimy et al.
2020/0314793 A1 10/2020 Kumar et al.
2020/0333871 A1* 10/2020 Brox ................... G11C 11/4074
2020/0351717 A1 11/2020 Bernstein et al.
2020/0358470 A1 11/2020 Dayan et al.
2020/0389239 A1 12/2020 Garcia et al.
2020/0413325 A1 12/2020 Meredith et al.
2021/0007033 A1 1/2021 Tada et al.
2021/0058879 A1 2/2021 Geng et al.
2021/0083942 A1 3/2021 Finkelstein
2021/0092662 A1 3/2021 Takahashi et al.
2021/0105227 A1 4/2021 Kawano et al.
2021/0105782 A1* 4/2021 Marcone ............... H04L 47/824
2021/0126697 A1 4/2021 Kumar et al.
2021/0143848 A1* 5/2021 Hirata ................... H04W 16/14
2021/0168679 A1* 6/2021 Liang .................... H04W 48/20
2021/0185541 A1 6/2021 Potharaju et al.
2021/0204231 A1 7/2021 Harada et al.
2021/0211889 A1 7/2021 Buddhikot et al.
2021/0219340 A1 7/2021 Shi et al.
2021/0235310 A1 7/2021 Monajemi et al.
2021/0242913 A1 8/2021 Manolakos et al.
2021/0266261 A1 8/2021 Hosokawa
2021/0297141 A1 9/2021 Schafer et al.
2021/0320399 A1 10/2021 Bisiules et al.
2021/0323054 A1 10/2021 Gibson et al.
2021/0329467 A1* 10/2021 Sevindik ............. H04W 88/085
2021/0337391 A1* 10/2021 Sevindik ................. H04W 8/26
2021/0351956 A1* 11/2021 Hu ...................... H04L 12/4641
2021/0377960 A1 12/2021 Carl et al.
2021/0378597 A1* 12/2021 Amos ................... G06F 18/214
2021/0385662 A1 12/2021 Furuichi
2021/0400046 A1 12/2021 Castinado et al.
2021/0410050 A1* 12/2021 Liu ....................... H04W 24/10
2022/0007198 A1 1/2022 Mahalingam et al.
2022/0029872 A1 1/2022 Cao et al.
2022/0045906 A1 2/2022 Petersen et al.
2022/0053491 A1* 2/2022 Sevindik ............. H04L 27/0002
2022/0060346 A1 2/2022 Sevindik et al.
2022/0060347 A1 2/2022 Sevindik et al.
2022/0061090 A1* 2/2022 Fehrenbach .......... H04W 72/20
2022/0078123 A1 3/2022 Lin De Medeiros et al.
2022/0078806 A1 3/2022 Sevindik et al.
2022/0124547 A1 4/2022 Young et al.
2022/0171055 A1 6/2022 Song et al.
2022/0201778 A1 6/2022 Wallburg et al.
2022/0232481 A1* 7/2022 Kusashima ....... H04W 72/0446
2022/0247467 A1* 8/2022 Huang .................. H04W 72/23
2022/0279532 A1* 9/2022 Barac .................... H04W 72/27

(56) References Cited

U.S. PATENT DOCUMENTS

| | | | | |
|---|---|---|---|---|
| 2022/0287014 | A1* | 9/2022 | Dong | H04W 72/20 |
| 2022/0287093 | A1 | 9/2022 | Iyer et al. | |

OTHER PUBLICATIONS

Cablelabs, Invention Disclosure 60436, Apr. 2014, https://www.cablelabs.com/wp-content/uploads/2014/04/60436-publish.pdf, 2 pages.
CableLabs Technical Report CM-TR-MHA-V02-081209, 2008.
Chapman J.T., "Mobile Backhaul over DOCSIS", SCTE-ISBE EXPO cable-Tec, Fall Technical forum, 2017.
Deering, S., et al., "Internet Protocol, Version 6 (IPv6) Specification," Internet Engineering Task Force (IETF) RFC 2460, Dec. 1998, 39 pages.
DOCSIS 3.1 Standard "Data-Over-Cable Service Interface Specifications—DOCSIS® 3.1" CM-SP-CM-OSSIv3.1-I11-171220.
Executive Brief, "Planning Today for Next-Gen DOCSIS?", Commscope 2019.
IEEE Std. 802.11 (1997), or related standards including 802.11 a/b/g/n/s/v/ac/ad/ax/ay/ba or 802.11-2012/2013, 802.11-2016, 459 pages.
IEEE Std. 802.11 or related standards including 802.11a/b/g/n/s/v/ac/ad/ax/ay/ba/be or 802.11-2012/2013, 802.11-2016.
"Internet Protocol, DARPA Internet Program, Protocol Specification", IETF RCF 791, Sep. 1981, 50 pages.
Kadir E.A., et al., "Performance Analysis of Wireless LAN 802.11 Standard for e-Learning", 2016 International Conference on Information and Communication Technology, 6 pages.
RFC 8034, White, et al., "Active Queue Management (AQM) Based on Proportional Integral Controller Enhanced (PIE) for Data-Over-Cable Service Interface Specifications (DOCSIS) Cable Modems", Internet Engineering Task Force (IETF), Feb. 2017.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Wi-Fi Direct, "Wi-Fi Peer-to-Peer (P2P) Specification," Wi-Fi Alliance, Version 1.5, 2014, 183 pages.

* cited by examiner

| Return split end (MHz) | Diplex Region (MHz) | Forward spectrum start (MHz) | Forward spectrum available (MHz) | Ration of downstream to upstream capacity |
|---|---|---|---|---|
| 204 | 54 | 258 | 1,536 | 7 : 1 |
| 300 | 78 | 378 | 1,416 | 5 : 1 |
| 396 | 102 | 498 | 1,296 | 3 : 1 |
| 492 | 120 | 612 | 1,182 | 2 : 1 |
| 588 | 150 | 738 | 1,056 | 1.7 : 1 |
| 684 | 174 | 858 | 936 | 1.3 : 1 |

FIG. 2C (Prior Art)

| E-UTRA Operating Band | Uplink (UL) operating band BS receive UE transmit | | | Downlink (DL) operating band BS transmit UE receive | | | Duplex Mode |
|---|---|---|---|---|---|---|---|
| | $F_{UL\_low}$ | – | $F_{UL\_high}$ | $F_{DL\_low}$ | – | $F_{DL\_high}$ | |
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26 [8] | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | | 2690 MHz | 2496 MHz | | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 3B (Prior art)

900
MSO DOMAIN
UE 139
FWA 143
UE 139
FWA 143
UE 139
UE 139
UE 139
831
xNBe
831
xNBe
825
CMe
825
CMe
121
HFC
107
COMBINER
VIDEO
EQAM MODULATOR
105
902
151
MSO BACKBONE
951
MSO CORE
CMTSe
803

825
CMe
PGM. MEMORY
PACKET PROCESSING LOGIC 1214
OS/ MIDDLEWARE 1213
QUEUE MGMT 1216
1207
MASS STORAGE
1217
CPU
DMA
1205
CONDITIONAL ACCESS/SECURE ELEMENT
MODEM/ BASEBAND PROCESSOR/MAC
1215
NETWORK INTERFACE/ ROUTER
1203
RF FRONT END 1210
RF FRONT END 1209
F1
Gbe, USB, WLAN
Coax In/Out

METHODS AND APPARATUS FOR SPECTRUM UTILIZATION COORDINATION BETWEEN WIRELINE BACKHAUL AND WIRELESS SYSTEMS

PRIORITY

This application is a continuation of and claims priority to co-owned and co-pending U.S. patent application Ser. No. 16/995,407 of the same title filed Aug. 17, 2020, and issuing as U.S. Pat. No. 12,041,589 on Jul. 16, 2024, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless equipment, and specifically, in one or more exemplary embodiments, to methods and apparatus for wireless and wireline network infrastructure coordination including on utilization of RF (radio frequency) spectrum.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized licensed or unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHZ). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

DOCSIS—

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

While DOCSIS 3.0 is currently the prevailing technology, DOCSIS 3.1 is rapidly being deployed as an upgrade to DOCSIS 3.0. DOCSIS 3.1 brings many fundamental changes, including Orthogonal Division Multiplexing (OFDM) as the new PHY layer modulation technology. In OFDM technology, the data is converted from serial to parallel, and transmitted on multiple orthogonal carriers simultaneously. Using the orthogonal multi-carrier concept of OFDM modulation improves the downstream and upstream throughput significantly, and reduces the receiver complexity in the CM and CMTS. Furthermore, bounding narrow band subcarriers in OFDM allows creation of wide band channels from 24 MHz to 192 MHZ, moving away from legacy 6 MHZ (or 8 MHz) channels of the type used in traditional DOCSIS 3.0/EuroDOCSIS deployments. See FIG. 2A, wherein the typical DOCSIS 3.0 allocation 200 includes broadband spectrum 204 at a frequency above the spectrum 202 used for broadcast television, SDV, VOD, and other traditional "video" services. Spectrum utilization is also increased in DOCSIS 3.1, up to approximately 1.2 GHz. FIG. 2B is a simplified graphical representation of DOCSIS 3.1 spectrum allocations; note that traditional DOCSIS 3.0 and QAM technology (i.e., non-OFDM-based modulation) can be used alongside the newer OFDM-based modulation schemes.

Another feature introduced in DOCSIS 3.1, is the Low Density Parity Check Code (LDPC) in upstream and downstream to optimize efficiency, provide robustness against narrow band interferers, and burst errors. The LDPC decoding efficiencies ostensibly increase the Signal-to-Noise ratio (SNR), allowing to use higher modulation for upstream and downstream. Prior to DOCSIS.31, the highest order modulation to allow reliable transmission were 64-QAM for upstream, and 256-QAM for downstream. Due to the LDPC error correcting efficiencies, the DOCSIS 3.1 standard supports 4096-QAM in downstream, and 1024-QAM in upstream, allowing the data transmission speed close to the theoretical limits.

FIG. 2C is a tabular representation of frequency bands associated with prior art cable systems including broadband (DOCSIS 4.0). DOCSIS 4.0, which is the latest specification for data transmission over cable as of the date of this writing, leverages the DOCSIS 3.1 technology to expand the downstream and upstream spectrum to use full spectrum available for cable network (5 MHz to approximately 1.8 GHz), which is about 600 MHz more than the 1.2 GHz available under DOCSIS 3.1. The Extended Spectrum DOCSIS (EDX) is designed to work over existing cable infrastructure.

DOCSIS 4.0, which is the latest specification for data transmission over cable as of the date of this writing, leverages the DOCSIS 3.1 technology to expand the downstream and upstream spectrum to use full spectrum available for cable network (0 to approximately 1.8 GHZ), which is about 600 MHz more than the 1.2 GHz available under DOCSIS 3.1. See FIG. 3C. The Extended Spectrum DOCSIS (EDX) is designed to work over existing cable infrastructure.

Full Duplex (FDX), another feature introduced in DOCSIS 4.0, will allow upstream and downstream traffic to occupy the same part of spectrum, thus doubling the throughput by using the existing HFC network characteristics.

Unaddressed Issues of RF Spectrum Allocation and Usage—

As described previously, the CM and CMTS are the two main components in DOCSIS backhaul systems. The CM receives/transmits the signal from/to the CMTS, and provides data services to premises. The CMTS controls and manages CMs deployed within the network. Furthermore, the CMTS specifies different service flows for different traffic types, and each service flow may be associated with a given modulation type in the downlink and uplink.

In some so-called "strand-based" wireless network deployment models such as those shown in FIG. 1A, a wireless node such as a CBRS CBSD 131 is connected to the service provider core via a DOCSIS backhaul comprising the aforementioned CM (e.g., at the served premises) and a CMTS located at e.g., the service provider headend or a hub of the service provider network. The CM is often connected to the base station (CBSD) via a relatively short cable such as a CAT-5/6 Ethernet cable and RJ-45 connectors, such that the CBSD is physically proximate to the CM (and hence the coaxial cable "drop" which provides connectivity from the HFC distribution network 121 to the premises.

Despite some level of shielding, such coaxial cable running to and within the premises can act in effect like an antenna for RF signals to which it is exposed (externally). A normal RG-type cable can carry radio frequency energy from e.g., 0 MHz all the way into the low GHz range (e.g., 2 GHZ and beyond), with attenuation generally increasing as a function of frequency. As such, cable operators may utilize frequencies up to e.g., 1.2 GHz for DOCSIS 3.1 applications, and 1.8 GHz for DOCSIS 4.0 applications, thereby extending the useful frequency range of the installed base of coaxial cable. Hence, external RF signals in these ranges, such as from a CBSD or cellular xNB, may in some circumstances cause increased interference with signals transmitted between the CMTS and CM, especially if the base station is very physically close to the cable and transmitting at appreciable power levels. Specifically, some shields may lose their effectiveness over time (especially in outdoor environments such as in cable strand deployments due to, inter alia, UV exposure, large temperature variations/extremes, etc. which may degrade cable materials). Generally speaking, coaxial cables do not possess thick shielding due to cost, weight, and installation considerations.

Further, depending direction and power of the interferer emissions, electromagnetic waves can propagate through such shields. Coaxial cable shields are also usually designed to be effective for certain frequency ranges, and as such cable installed 10 or 20 years prior to the date of this filing may not have effective shields for new frequency spectrum currently being implemented.

Yet a further consideration relates to the cable connectors used with the installed base of coaxial cable. These connectors may, even in an un-degraded condition, experience substantial interference also due to inter alia, no shielding being present at the connectors themselves.

As new wireless systems and frequency bands are being fielded, including in the frequency bands traditionally occupied by cable systems (see e.g., FIG. 3A, illustrating new Band 71 with the 600 MHz region, and FIG. 3B showing e.g., Bands 12-17 in the 700 MHz region), opportunities for interference between the small-cell base stations deployed by network operators such as cable MSOs and their backhauling DOCSIS infrastructure are increasing. Such interference may manifest itself as a variety of undesirable conditions or symptoms, such as e.g., reduced signal-to-noise ratios (e.g., SINR), increased BER or PER, increased packet loss and retransmission requests, etc. within the DOCSIS channels. These conditions can lead to reduced data throughput, and ultimately reduced user experience or satisfaction with the service provider's services.

Hence, improved apparatus and methods for coordination between the wireline (e.g., DOCSIS) backhaul and the deployed base station served by that backhaul are needed, especially with regard to RF spectrum utilized by the base station and the wireline backhaul.

SUMMARY

The present disclosure addresses the foregoing needs by providing, inter alia, methods and apparatus for enhancing coordination between a wireless base station and its wireline backhaul, including regarding spectrum utilization.

In a first aspect of the disclosure, a computerized method of operating a packet network infrastructure comprising at least one packet receiver apparatus and at least one packet transmitter apparatus is described. In one embodiment, the method includes; identifying at the at least one packet receiver apparatus a first type of equipment connected to the at least one packet transmitter apparatus; based at least on the identifying, causing establishment of at least one service flow between the at least one packet receiver apparatus and the at least one packet transmitter apparatus; and causing data relating to the at least one service flow to be transmitted to the connected first type of equipment, the transmitted data configured to enable the connected first type of equipment to perform at least a wireline frequency selection optimization process with respect to at least downlink data transmissions to one or more client devices thereof.

In one variant, the packet network infrastructure comprises a DOCSIS (data over cable service specification) packet data system, the at least one packet receiver apparatus comprises an enhanced cable modem termination system (CMTSe), and the at least one packet transmitter apparatus comprises an enhanced cable modem (CMe). In one implementation, the identifying at the at least one packet receiver apparatus a first type of equipment connected to the at least one packet transmitter apparatus comprises identifying a wireless base station connected to the CMe based at least in inspecting one or more packet headers for packets transmitted to the CMe, the one or more packet headers of the transmitted packets having been marked with a prescribed designation by the wireless base station. Identification of the packets as originating from a wireless base station in one embodiment allows for communication between the CMTSe and the base station (via the CMe) to mitigate any potential interference due to base station wireless transmissions.

In one configuration thereof, the wireless base station comprises a 3GPP (Third Generation Partnership Project) compliant base station operating within a licensed frequency band such as e.g., Band 71 or Bands 12-17, and the causing data relating to the at least one service flow to be transmitted to the connected first type of equipment, the transmitted data configured to enable the CMTSe to assess and adapt as necessary at least one of its DL or UL channels with the CMe.

In another implementation, the causing establishment of at least one service flow between the at least one packet receiver apparatus and the at least one packet transmitter apparatus comprises establishing a prioritized service flow dedicated to the base station only.

In another aspect, a computerized method of operating a packet network infrastructure comprising at least one packet receiver apparatus and at least one packet transmitter apparatus is disclosed. In one embodiment, the method includes: obtaining data at the at least one packet receiver apparatus from wireless equipment connected to the at least one packet receiver apparatus, the obtained data comprising data relating to wireless frequency usage by the wireless equipment; and causing data relating to the obtained data to be transmitted to the at least one packet transmitter apparatus, the transmitted data configured to enable the at least one transmitter apparatus to perform at least an optimization process with respect to one or more radio frequency (RF) channels utilized by the packet network infrastructure for communication between the at least one packet receiver apparatus and the at least one packet transmitter apparatus.

In one variant, the method further includes: identifying at the at least one packet transmitter apparatus, the wireless equipment connected to the at least one packet receiver apparatus; and based at least on the identifying, causing establishment of at least dedicated one service flow between the at least one packet receiver apparatus and the at least one packet transmitter apparatus for use by the wireless equipment or one or more client devices associated therewith. The identifying at the at least one packet transmitter apparatus the wireless equipment comprises for example identifying a wireless base station connected to a cable modem (CM) based at least in inspecting one or more packet headers for packets transmitted to the CM, the one or more packet headers of the transmitted packets having been marked with a prescribed designation by the wireless base station.

In a further variant, the packet network infrastructure comprises a DOCSIS (data over cable service specification) packet data system, the at least one packet transmitter apparatus comprises a cable modem termination system (CMTS), and the at least one packet receiver apparatus comprises a cable modem (CM).

In yet another variant, the causing data relating to the obtained data to be transmitted to the at least one packet transmitter apparatus comprises causing transmission of data indicative of at least one frequency band utilized by the wireless equipment for wireless transmissions.

In another variant, the causing data relating to the obtained data to be transmitted to the at least one packet transmitter apparatus further comprises causing transmission of data indicative of at least one azimuth or sector utilized by the wireless equipment for wireless transmissions using the at least one frequency band.

In another embodiment of the method, the performance of the at least optimization process with respect to one or more radio frequency (RF) channels utilized by the packet network infrastructure for communication between the at least one packet receiver apparatus and the at least one packet transmitter apparatus comprises performing, via the at least one packet transmitter apparatus: evaluation of one or more parameters relating to channel quality for the one or more RF channels; and based at least on the evaluation, causing: (i) migration of one or more modem apparatus utilizing the one or more RF channels to one or more respective new RF channels; and (ii) modification to a frequency selection algorithm used at least within an OFDM (orthogonal frequency division multiplexing) based transmitter to remove the one or more RF channels from further use at least for a period of time.

In another aspect of the disclosure, computerized network apparatus for use in a network is described. In one embodiment, the network apparatus includes: at least one packet data interface configured for communication with a radio frequency transceiver apparatus; processor apparatus in data communication with the at least one packet data interface; and storage apparatus in data communication with the processor apparatus, the storage apparatus comprising at least one computer program.

In one variant, the at least one computer program is configured to, when executed by the processor apparatus, cause the computerized network apparatus to: receive first data packets via the at least one packet data interface, the first data packets comprising data relating to a configuration of a wireless access node; evaluate the received first data packets to determine at least one operating band used by the wireless access node; and based at least on the evaluation, transmit data to the radio frequency transceiver apparatus causing removal of the at least one operating band from a pool of available frequency bands for use by at least a modem apparatus associated with the wireless access node.

In another variant, the computerized network apparatus comprises a DOCSIS cable modem termination system (CMTS), the radio frequency transceiver apparatus comprises a QAM (quadrature amplitude modulation) modulator, and the modem apparatus comprises a DOCSIS cable modem (CM) which is used to backhaul the wireless access node. In one implementation thereof, the at least one computer program is further configured to, when executed by the processor apparatus, cause the computerized network apparatus to transmit data to the radio frequency transceiver apparatus causing removal of the at least one operating band from a pool of available frequency bands for use a plurality of modem apparatus including the at least modem apparatus associated with the wireless access node, the plurality of modem apparatus having a common operational or configuration attribute.

In another variant, the common operational or configuration attribute comprises membership in at least one of a common service group or common logical group. For instance, the common operational or configuration attribute may include membership in a common service group, the common service group comprising at least the plurality of modem apparatus disposed within a common multi-premises structure.

In another variant, the at least one computer program is further configured to, when executed by the processor apparatus, cause the computerized network apparatus to transmit data to the radio frequency transceiver apparatus causing inclusion of the at least one operating band within a pool of available frequency bands for use a plurality of modem apparatus including the at least modem apparatus associated with the wireless access node, the pool comprising at least one frequency band which is to be used only under a prescribed one or more operational conditions.

In another embodiment of the computerized network apparatus, the at least one computer program is further configured to, when executed by the processor apparatus, cause the network apparatus to: receive data indicative of a change in at least part of the data relating to the configuration; and based at least on the received data indicative of the change, transmit second data to the radio frequency transceiver apparatus causing the radio frequency transceiver apparatus to (i) restore the removed at least one frequency band to the pool; and (ii) remove at least one other frequency band from the pool.

In yet a further aspect, computerized wireless access node apparatus is disclosed. In one embodiment, the node apparatus includes: at least one first packet data interface for interface with a radio frequency modulation/demodulation apparatus; at least one wireless interface for interface with one or more wireless user devices; processor apparatus in data communication with the at least one first packet data interface and the at least one wireless interface; and storage apparatus in data communication with the processor apparatus, the storage apparatus comprising at least one computer program.

In one variant, the at least one computer program is configured to, when executed by the processor apparatus, cause the computerized wireless access node apparatus to: transmit data relating to a configuration of the computerized wireless access node apparatus to a network apparatus via the radio frequency modulation/demodulation apparatus, the network apparatus and radio frequency modulation/demodulation apparatus communicative via at least one wireline radio frequency channel, the data configured to enable the network apparatus to modify at least one aspect of the at least one wireline radio frequency channel to enhance at least one of data throughput or signal quality thereof.

In one implementation thereof, the radio frequency modulation/demodulation apparatus comprises a cable modem within a hybrid fiber coax (HFC) network; the wireless access node comprises a 3GPP-compliant NodeB operative within a frequency band of 617 to 698 MHz; and the data relating to the configuration comprises data at least indicative of at least one carrier frequency used by the wireless access node within the frequency band.

In one configuration, the modification of the at least one aspect of the at least one wireline radio frequency channel to enhance at least one of data throughput or signal quality thereof comprises migration of the at least one wireline RF channel to a new frequency band so as mitigate interference with the at least one carrier frequency.

In another configuration, the modification of the at least one aspect of the at least one wireline radio frequency channel to enhance at least one of data throughput or signal quality thereof comprises at least one of: (i) an increase in a modulation order of the at least one wireline RF channel, or (ii) an increase in the FEC (forward error correction) robustness of the at least one wireline RF channel.

In another variant of the node apparatus, the at least one computer program is further configured to, when executed by the processor apparatus, cause the node apparatus to implement a temporary suspension or modification of at least one aspect of its operation in coordination with the network apparatus so as to enable the network apparatus to assess an effect of the operation of the wireless access node apparatus on the at least one wireline radio frequency channel.

In another aspect, computerized modem apparatus for use in a data network is disclosed. In one embodiment, the modem apparatus comprises: a radio frequency (RF) interface; at least one packet data interface; processor apparatus in data communication with the at least one packet data interface and the RF interface; and storage apparatus in data communication with the processor apparatus. In one variant, the storage apparatus comprising at least one computer program configured to, when executed by the processor apparatus, cause the modem apparatus to: receive first data packets via the at least one packet data interface; determine that at least a portion of the received first data packets are sourced from a wireless access node such as one operating within a frequency band of 600-800 MHz; based at least on the determination, forward the at least portion of the received first data packets that are sourced from the wireless access node to a packet receiver apparatus in data communication with the modem apparatus via at least the RF interface; and enable establishment of one or more service flows between the modem apparatus and the receiver apparatus for use by the wireless access node, the service flows utilizing a non-interfered carrier.

In one implementation, the at least one packet receiver apparatus comprises a DOCSIS cable modem termination system (CMTS), and the modem apparatus comprises a DOCSIS cable modem (CM).

In another aspect, a method of conducting, at a network modem apparatus, an evaluation to determine the channel capacity so as to determine whether modification to a frequency mapping plan in use within a wireline network interface is required.

In another aspect of the disclosure, computerized premises apparatus for use in a wireless network is described. In one embodiment, the apparatus includes: at least one wireless interface; processor apparatus in data communication with the at least one wireless interface; at least one network backhaul interface; and storage apparatus in data communication with the processor apparatus.

In one variant, the storage apparatus comprises at least one computer program configured to, when executed by the processor apparatus: engage in communication with one network device via the at least one network backhaul interface of the computerized premises apparatus; determine a data transmission configuration, the configuration for the transmission of data to one or more client devices using the antennas of the computerized device; enable establishment of a wireless connection between the computerized premises apparatus and the one or more client devices; and based at least on a criterion relating to performance or capability, alter at least one aspect of the premises apparatus in order to enhance wireline channel quality on the backhaul.

In one implementation, the computerized premises apparatus includes a 3GPP-compliant NodeB (xNB) configured to operate in a licensed frequency band such as e.g., Band 71, Band 12, or Bands 13-17; and the network device includes a DOCSIS 3.1 or DOCSIS 4.0 compliant modem.

In a further aspect of the disclosure, computer readable apparatus including a non-transitory storage medium, the non-transitory medium including at least one computer program having a plurality of instructions is disclosed. In one embodiment, the plurality of instructions are configured to, when executed on a processing apparatus: receive data relating to a configuration used for transmission of data between a base station connected to a modem and a UE, and based on the received data, adjust a configuration of at least one OFDM channel between a modem termination system and the modem.

In one variant, the storage apparatus includes a storage medium configured to store one or more computer programs, such as on a CMTS. In one embodiment, the apparatus includes a program memory or HDD or SSD and stores one or more computer programs.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

These and other aspects shall become apparent when considered in light of the disclosure provided herein.

BRIEF DESCRIPTION OF THE DRAWINGS

FIG. 2C is a tabular representation of frequency bands associated with prior art cable systems including broadband (DOCSIS 4.0).

FIG. 3B is a tabular representation of various E-UTRA RF spectrum bands currently allocated.

Figure 1:
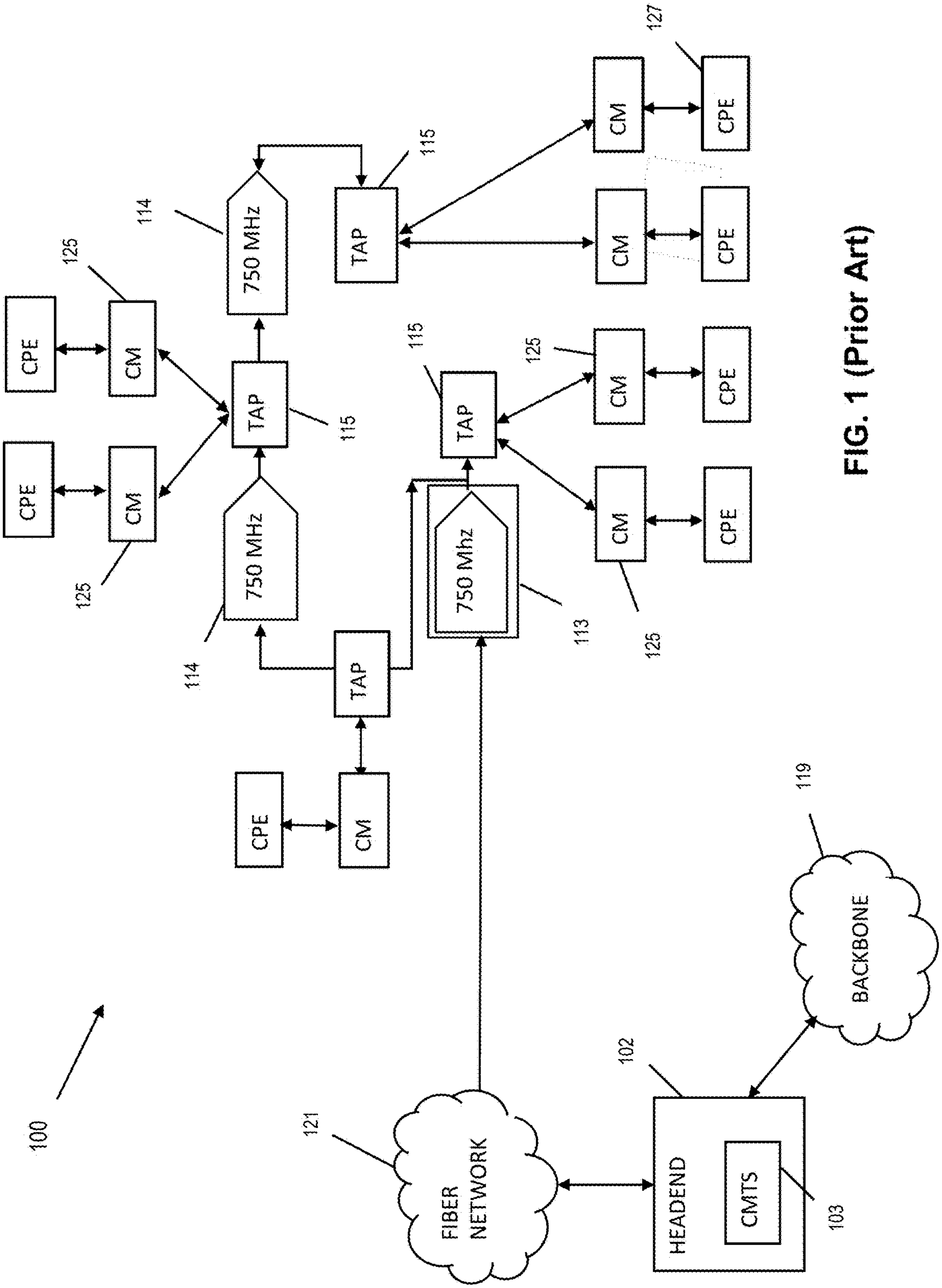
FIG. 1 is a block diagram illustrating a prior art hybrid fiber-coaxial (HFC) data network for delivery of data to end user devices.
Figure 1A:
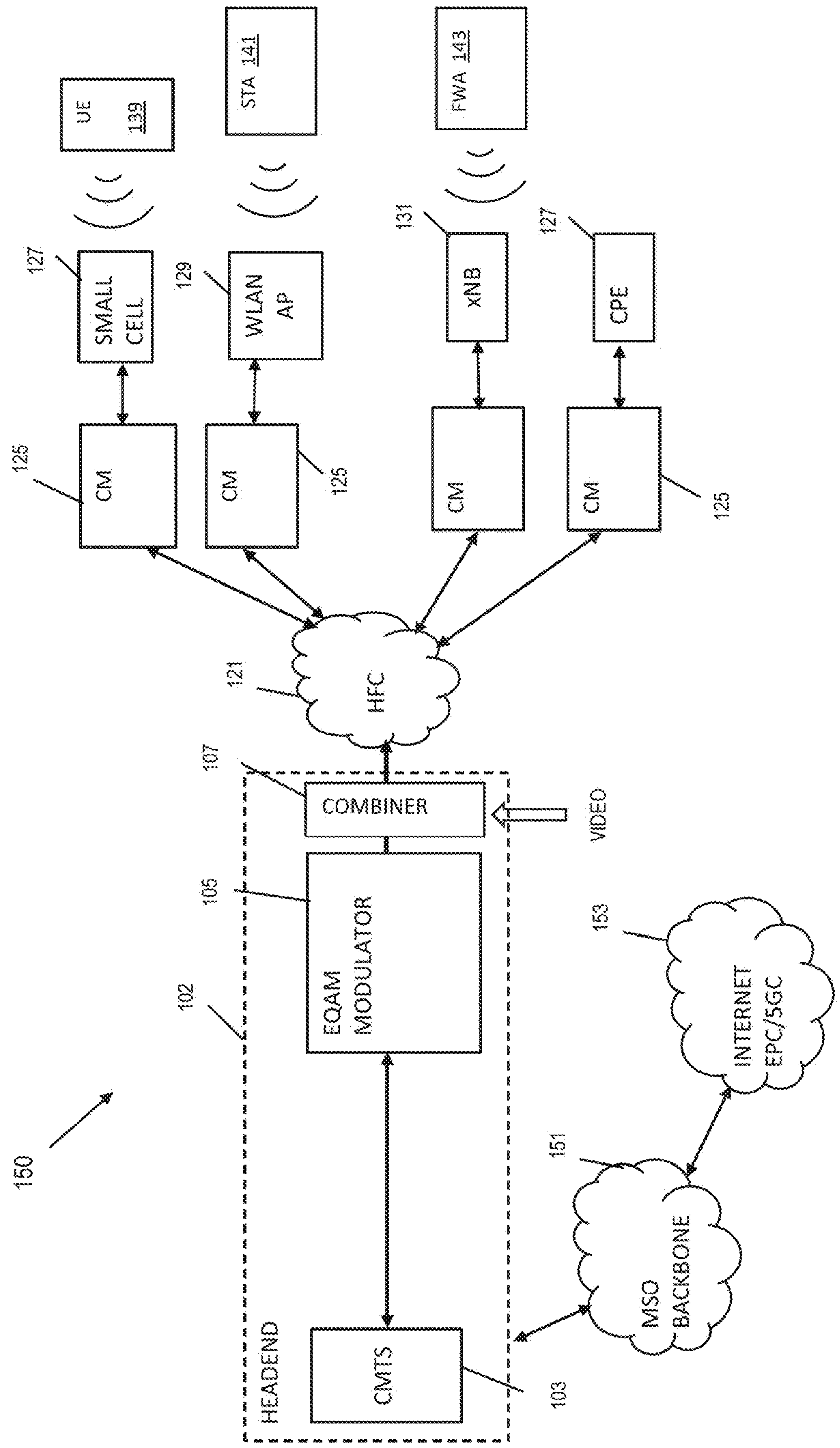
FIG. 1A is a block diagram illustrating the DOCSIS infrastructure of the HFC network of FIG. 1, and various types of backhauled premises devices.
Figure 2A:
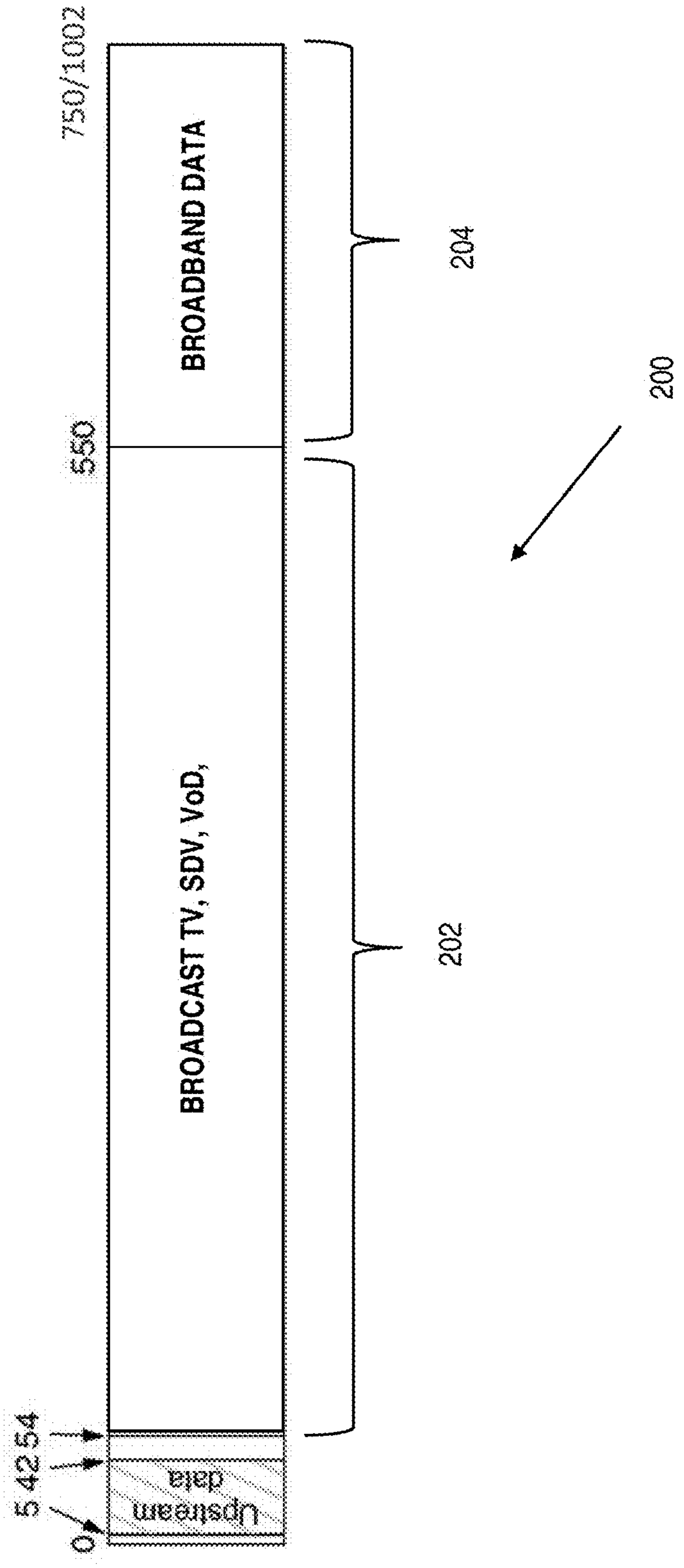
FIG. 2A is a graphical representation of frequency bands associated with prior art cable systems including broadband (DOCSIS 3.0).
Figure 2B:
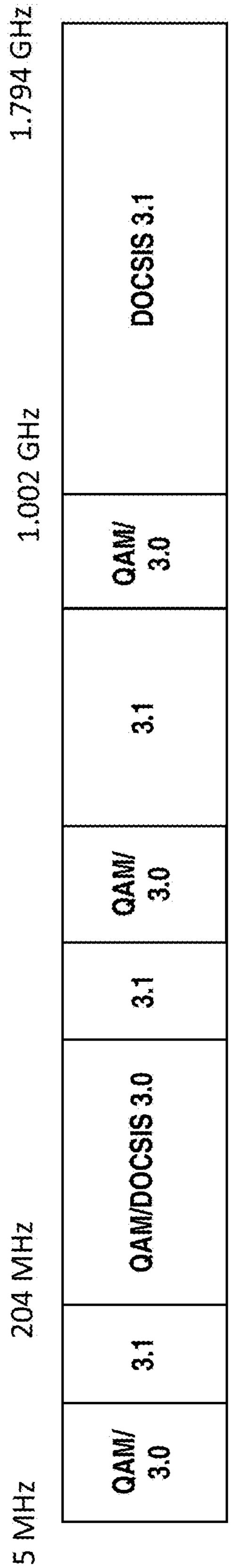
FIG. 2B is a graphical representation of frequency bands associated with prior art cable systems including broadband (DOCSIS 3.1).

All Figures© Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service* (*CBRS*): *Spectrum Access System* (*SAS*)—*Citizens Broadband Radio Service Device* (*CBSD*) *Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G) DDR/2/3/4/5/6 SDRAM, EDO/FPMS, RLDRAM, SRAM, “flash” memory (e.g., NAND/NOR), 3D memory, stacked memory such as HBM/HBM2, and spin Ram, PSRAM.

As used herein, the terms “microprocessor” and “processor” or “digital processor” are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms “MSO” or “multiple systems operator” refer to a cable, satellite, or terrestrial network provider having infrastructure required to deliver services including programming and data over those mediums.

As used herein, the terms “MNO” or “mobile network operator” refer to a cellular, satellite phone, WMAN (e.g., 802.16), or other network service provider having infrastructure required to deliver services including without limitation voice and data over those mediums.

As used herein, the terms “network” and “bearer network” refer generally to any type of telecommunications or data network including, without limitation, hybrid fiber coax (HFC) networks, satellite networks, telco networks, and data networks (including MANS, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term “network interface” refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms “5G” and “New Radio (NR)” refer without limitation to apparatus, methods or systems compliant with 3GPP Release 15, and any modifications, subsequent Releases, or amendments or supplements thereto which are directed to New Radio technology, whether licensed or unlicensed.

As used herein, the term “QAM” refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term “quasi-licensed” refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term “SAE (Spectrum Allocation Entity)” refers without limitation to one or more entities or processes which are tasked with or function to allocate quasi-licensed spectrum to users. Examples of SAEs include SAS (CBRS). PMSE management entities, and LSA Controllers or Repositories.

As used herein, the term “SAS (Spectrum Access System)” refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term “server” refers to any computerized component, system or entity regardless of form which is adapted to provide data, files, applications, content, or other services to one or more other devices or entities on a computer network.

As used herein, the term “shared access” refers without limitation to (i) coordinated, licensed sharing such as e.g., traditional fixed link coordination in 70/80/90 GHz and the U.S. FCC’s current rulemaking on potential database-coordinated sharing by fixed point-to-multipoint deployments in the C-band (3.7-4.2 GHZ); (ii) opportunistic, unlicensed use of unused spectrum by frequency and location such as TV White Space and the U.S. FCC’s proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other licensed/leased bands such as e.g., Bands 12-17 and 71.

As used herein, the term “storage” refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term “users” may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term “Wi-Fi” refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the “Wi-Fi Peer-to-Peer (P2P) Specification”, incorporated herein by reference in its entirety).

As used herein, the term “wireless” means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term wireline includes electrical and optical transmission media such as, without limitation, coaxial cable, CAT-5/6 cable, and optical fiber.

As used herein, the term "xNB" refers to any 3GPP-compliant node including without limitation eNBs (eUTRAN) and gNBs (5G NR).

Overview

In one exemplary aspect, the present disclosure provides methods and apparatus for enhancing coordination and frequency adaptation with respect to base stations (e.g., xNB) that are backhauled by wireline networks such as DOCSIS cable networks. In one embodiment, enhanced communication between the base station and its backhaul network including the wireline modem components thereof such as the CMTS enable the backhaul network to better compensate as needed for any effects of interference on the backhaul from e.g., the wireless transmission of base station (or other proximate base stations), including on a base station/strand-specific basis when needed.

In one variant, an enhanced CMTS (CMTSe) is disclosed which has processes operative thereon that, inter alia, enable selective utilization of channel evaluation and modification for DOCSIS channels allocated to various cable modems, including those operating under incipient DOCSIS network technologies such as DOCSIS 3.1 and 4.0.

In one implementation, an enhanced xNB (xNBe) is configured to transmit data regarding its configuration (including frequency usage, sectors, PCIs, etc.) to the CMTSe, so as to enable the CMTSe to dynamically adapt the operation of at least the cable modem associated with the xNBe so as to mitigate any interference from the XNBe's wireless transmissions. In one such approach, the CMTSe is also configured with logic that enables it to either actively (e.g., through actual measurement of channel conditions or associated parameters) or passively (e.g., via modeling, historical data, or estimates) determine a scope of impact by the target xNBe, such as on other cable modems being used within an urban area or MDU (multi-dwelling unit), and hence the scope of modification or adaptation needed to be implemented in order to minimize the adverse impact of the xNBe's transmissions.

Employing the coordination, and the frequency adaptation techniques discussed above provides enhanced DL and UL capacity for the user device(s) connected to the xNBe while permitting xNBe operation within new frequency bands (such as between 600 and 800 MHZ), thereby effectively enabling addition of more services and customers to the network with a given CAPEX (capital expenditure). Such operation may also advantageously include operation in dense urban or MDU environments where multiple such xNBe devices may be operating in close proximity to one another.

The methods and apparatus described herein may also advantageously be extended to other licensed, unlicensed or shared-access architectures (i.e., other than the aforementioned 600-800 MHz range), including for wireless devices operating in the range above 1 GHZ (e.g., up to 1.8 GHZ) which may conflict with or adversely affect operation of DOCSIS 3.1 or 4.0 systems operating in that range, or at yet higher frequencies (such as under incipient so-called "Extended Spectrum DOCSIS" wherein frequencies on the order of 5 GHz or higher may be used in some applications).

Detailed Description of Exemplary Embodiments

Exemplary embodiments of the apparatus and methods of the present disclosure are now described in detail. While these exemplary embodiments are described in the context of the previously mentioned base station (e.g., 3GPP eNB or gNB), wireless access points using licensed or leased spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of spectrum (e.g., unlicensed and/or quasi-licensed, such as that managed by a spectrum allocation entity), other radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version* 6 (*IPv*6) *Specification*, IETF RFC 2460 (December 1998), each of which is incorporated herein by reference in its entirety), it will be appreciated that the present disclosure may utilize other types of protocols (and in fact bearer networks to Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Methodology—

Various methods and embodiments thereof for enhancing communication and frequency adaptation of a wireless device backhauled by a DOCSIS network according to the present disclosure are now described with respect to FIGS. 4-7.

Figure 4:
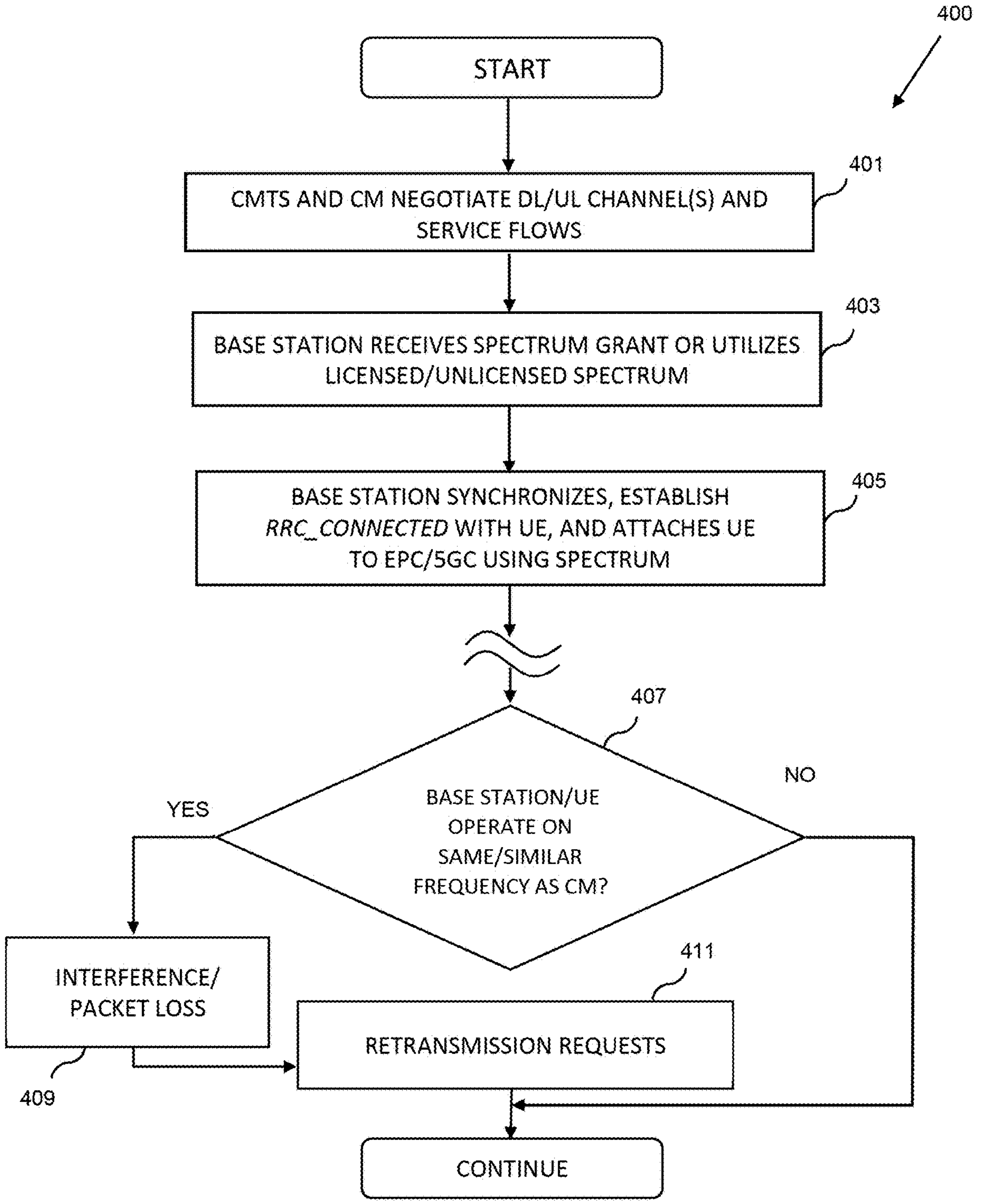
FIG. 4 is a logical flow diagram illustrating a typical prior art data operational and backhaul scenario for a wireless base station (e.g., CBSD) backhauled via the DOCSIS infrastructure of FIG. 1A.

However, before discussing these embodiments, it is illustrative to review in detail the operation of extant DOCSIS systems while servicing a wireless device via a base station backhauled thereby. Referring now to FIG. 4, a prior art sequence 400 for wireless device service provision is conceptually shown. At step 401, the CMTS and CM negotiate channel configuration and service flows, such as for a DL bearer and service flow as set forth in the exemplary DOCSIS protocols incorporated by reference elsewhere herein.

Per steps 403 and 405, the user device (e.g., a 3GPP UE such as a mobile device or FWA) utilizes radio frequency spectrum within which it is permitted to operate (whether natively by virtue of its chipset/architecture, licensing, or via a dynamic grant of spectrum), and implements so-called "RACH" (random access channel) procedures to synchronize with the base station (e.g., gNB or eNB, hereinafter "xNB"). Pursuant thereto, the UE also subsequently connects to the xNB to establish a radio resource layer connected state (i.e., RRC_Connected) via UL and DL shared channels and associated procedures. RACH and RRC procedures are well known, and not described further herein.

Once connected, the UE transacts its application data over the xNB, CM and CMTS backhaul with e.g., a distant networked server process, utilizing e.g., 3GPP packet data network (PDN) infrastructure. As part of such transaction, application layer or user-plane (UP) data is transacted back and forth, such as for delivery of streaming media to the connected UE. As such, the CMTS routes DL data packets destined for the UE application to the CBSD via the CM using the established service flows.

Per step 407, the BS (xNB) and the backhaul may or may not be operating on a common frequency. For instance, as previously described, in the exemplary context of a DOCSIS cable system backhaul, the spectrum utilized by the xNB for its air interface(s) (e.g., 600 MHz up to 1.2 GHZ) may overlap with that used for OFDM channels established by the DOCSIS 3.1 modem. As a brief aside, such OFDM interfaces will utilize a plurality of RF carriers of different frequency, to establish so-called "time frequency" resources which can be e.g., accessed by different CMs communicating with a common CMTS. These carriers may or may not be generally contiguous in frequency, and as such, all or only portions of a given carrier assignment may be overlapping with a spectral band used by the xNB. In the exemplary context of the 3GPP-based xNB, an OFDM-based air interface (e.g., FDD based) is also used for the wireless links between the xNB and its served devices (UE), and as such there may be a fairly complex relationship between the actual set of carriers used by the DOCSIS system and the xNB air interface. These may or may not, depending on factors such as proximity of the xNB to the physical backhaul coaxial cable, transmit power, transmit sectorization and direction, etc., result in interference or reduction of performance for the DOCSIS channels.

Returning to FIG. 4, in that there is no cooperation or cognizance of the frequencies, modulation schemes, etc., used by the DOCSIS system and those used by the 3GPP wireless system, interference and packet loss (including symptomatically increased BER/PER, increased retransmission requests, etc.) per steps 409 and 411 may occur if the interference is severe enough. Note that this interference is generally unidirectional in nature; i.e., (i) the wireless transmissions from the xNB may interfere with the cable channels, but not vice versa due to shielding of the cable and relatively low transmission power of signals on the cable from the CMTS and any amplifier stages interposed, and (ii) xNB transmissions may interfere with the cable, but counterpart UE wireless transmissions will have little if any effect due to e.g., their much lower power compared to the xNB transmissions, including resulting from mechanisms within 3GPP protocols to adjust UE transmit power (e.g. conserve UE battery capability). However, it is recognized that multiple UE may, in the aggregate when transmitting simultaneously in a same or similar band to one another which also overlaps with the cable operating frequency, may conceivably cause increased interference with the cable signals. As such, the present disclosure contemplates that data relating to UE-to-xNB (i.e., wireless UL) transmissions may also be employed for management of cable operation and mitigation measures as described elsewhere herein, similar to the data relating to the xNB DL transmissions.

It will be appreciated that FIG. 4 is somewhat of a simplified representation of the actual operations and steps; for instance, data is transacted multiple times between UE and xNB during RACH and connection, and between the xNB and the core during attachment, as well as for negotiation with the network server, etc.

Figure 5:
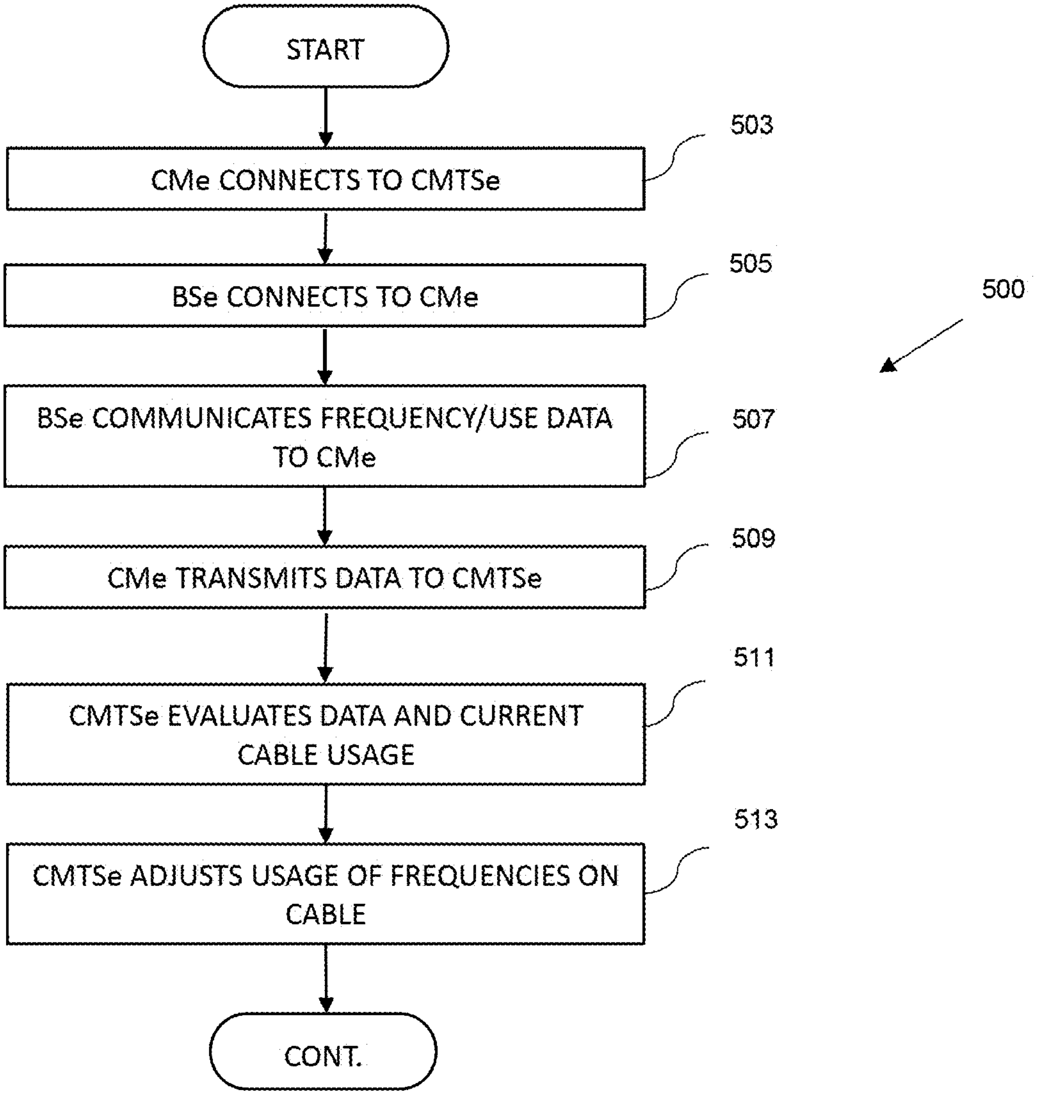
FIG. 5 is a logical flow diagram illustrating one embodiment of a generalized method for frequency spectrum coordination between an enhanced wireless base station (e.g., CBSD) backhauled via the improved DOCSIS infrastructure of the present disclosure.

With the foregoing as a backdrop, the exemplary methods of providing enhanced communication and throughput according to the present disclosure are now described with respect to FIG. 5.

At step 503 of the method 500, the CMTSe 803 and CMe 831 (see FIG. 8) connect and negotiate channel configuration and service flows, such as for a DL bearer and service flow as set forth in the exemplary DOCSIS protocols incorporated by reference elsewhere herein. As described subsequently herein, such negotiation may also include the CMTSe establishing one or more designated/dedicated "base station" service flows for transacting data destined for, or transmitted by, the xNBe.

Per step 505, the base station (e.g., xNBe) connects to the CMe (such connection which may be pre-existing, such as by virtue of e.g., IEEE Std. 802.3 or similar protocols previously executed between the MACs of the devices). This connection enables two-way transaction of data between the devices.

Figure 3A:
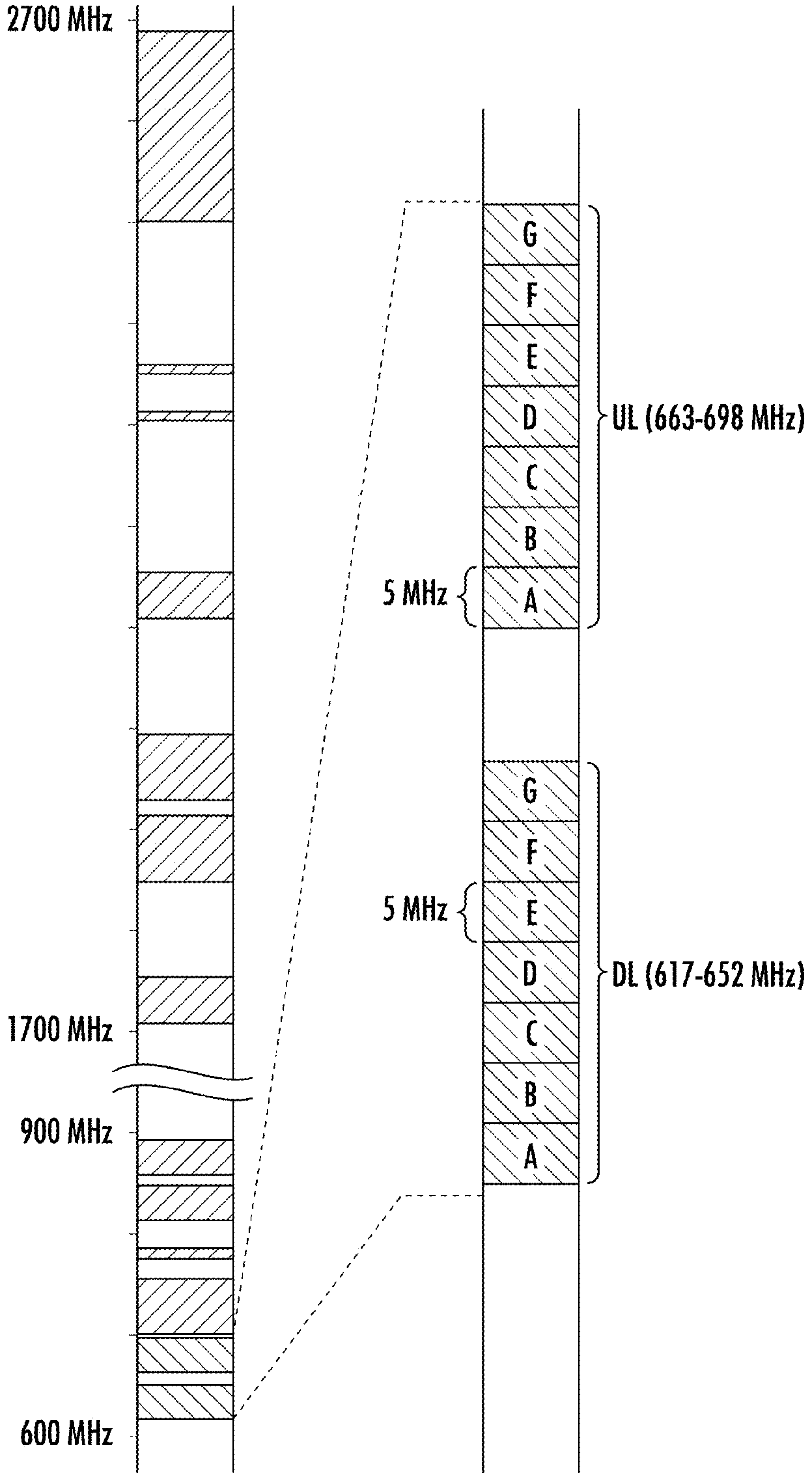
FIG. 3A is a graphical representation of Band 71 radio frequency (RF) spectrum currently allocated for use by the FCC.

Per step 507, the xNBe communicates frequency and other use or configuration data to the CMe. This data may include for instance data indicative of the current DL (Tx) frequencies (or a band of frequencies) used by the xNB for communicating with one or more UE. In some cases, this description may be broadly drawn; for example, if the xNBe is configured to operate only within the range of 600-800 MHZ, this data can be communicated as such, without particular narrower definitions which may vary with time. Alternatively, if desired, the xNBe may be configured to provide narrower, more time-variant descriptions, such as when a particular frequency or band of frequencies (say 617-652 MHz on the Band 71 DL as shown in FIG. 3A) is contemplated for use for a period of time, or duration of a connection with a given UE or set of UE. While the former approach has the benefit of simplicity and reduced "hopping" or adaptation that may be needed by the CMTSe (described below), it also potentially over-allocates spectrum to the xNBe, thereby potentially unnecessarily resulting in preemption of use of such frequencies by the CMTSe/CMe on the wireline backhaul.

Per step 509, the CMe transmits the received data to the CMTSe using e.g., an established upstream bearer. It will be appreciated that various different schemes for such transmission are contemplated, including e.g., (i) a "pass through" such as where the data packets containing the above-referenced frequency/configuration data are addressed to a recipient port/socket or process on the CMTSe, or (ii) the data packets are addressed to a socket/port or process on the CMe, which upon receipt de-encapsulates them, performs any additional processing required, and then re-encapsulates them and addresses them for transmission to the target CMTSe process. For example, in some cases, the CMe may be configured to add further data to that received from the xNBe, which may be useful to the CMTSe in performing the evaluations/analysis described subsequently herein, such as e.g., channel statistics or estimation data, prioritization or classification data (such as by adding data to the IP packet header(s) indicating that the data is associated with a wireless base station or other class of device which merits differentiated treatment by the CMTSc.

Per step 511, the CMTSe receives the transmitted data (whether passed-through or appended, as previously described) from the CMe and evaluates the configuration/frequency data contained therein relating to the particular device. In one variant, the data is associated with a base station or other unique identifier which allows the CMTSe to maintain a correlation table (e.g., LUT) or other data structure which enables the CMTSe to determine frequency usage versus specific base station at any given point in time. The serving/connected CMe may also be identified therein, such that the CMTSe can, if desired, form larger-scale relationships between individual base station-equipped "strands" served by the CMTSe (such as identification of common physical service groups or "virtual" service groups, examples of the latter described in co-owned and co-pending U.S. patent application Ser. No. 16/986,131 filed Aug. 5, 2020 and entitled "APPARATUS AND METHODS FOR OPTIMIZING CAPACITY IN WIRELINE CABLE NETWORKS WITH VIRTUAL SERVICE GROUPS," which is incorporated herein by reference in its entirety).

As part of step 511, the CMTSe or a designated proxy process thereof may also determine current frequency mapping or usage within the wireline operational spectrum (e.g., within available DOCSIS bands). This may be done for example on a limited basis, such as where the CMTSe determines whether the band(s) indicated by the xNBe data are in use within the pool of current or available CMTSe frequencies that can be allocated.

Additionally, as described below, some variants of the methodology may look at individual channels or bands in use to determine whether interference or degradation exists (or is projected to exist), before determining any appropriate course of action.

Lastly, per step 513, the CMTSe utilizes the results of the evaluation of step 511 to determine appropriate remediation or adaptation for frequencies on the cable medium. For instance, in one variant, the CMTSe may determine that one or more CMe need to be reassigned to a new carrier (set) or frequency band. Alternatively, the CMTSe may attempt other measures, such as reducing the modulation order (e.g., from 1024-QAM to 256-QAM) on the CMTSe/CMe interface, changing FEC schemes (such as enhancing LDPC parameters), or changing other channel parameters in an attempt to reduce the deleterious effects (if any) caused by the co-located or nearby transmitter.

Figure 6:
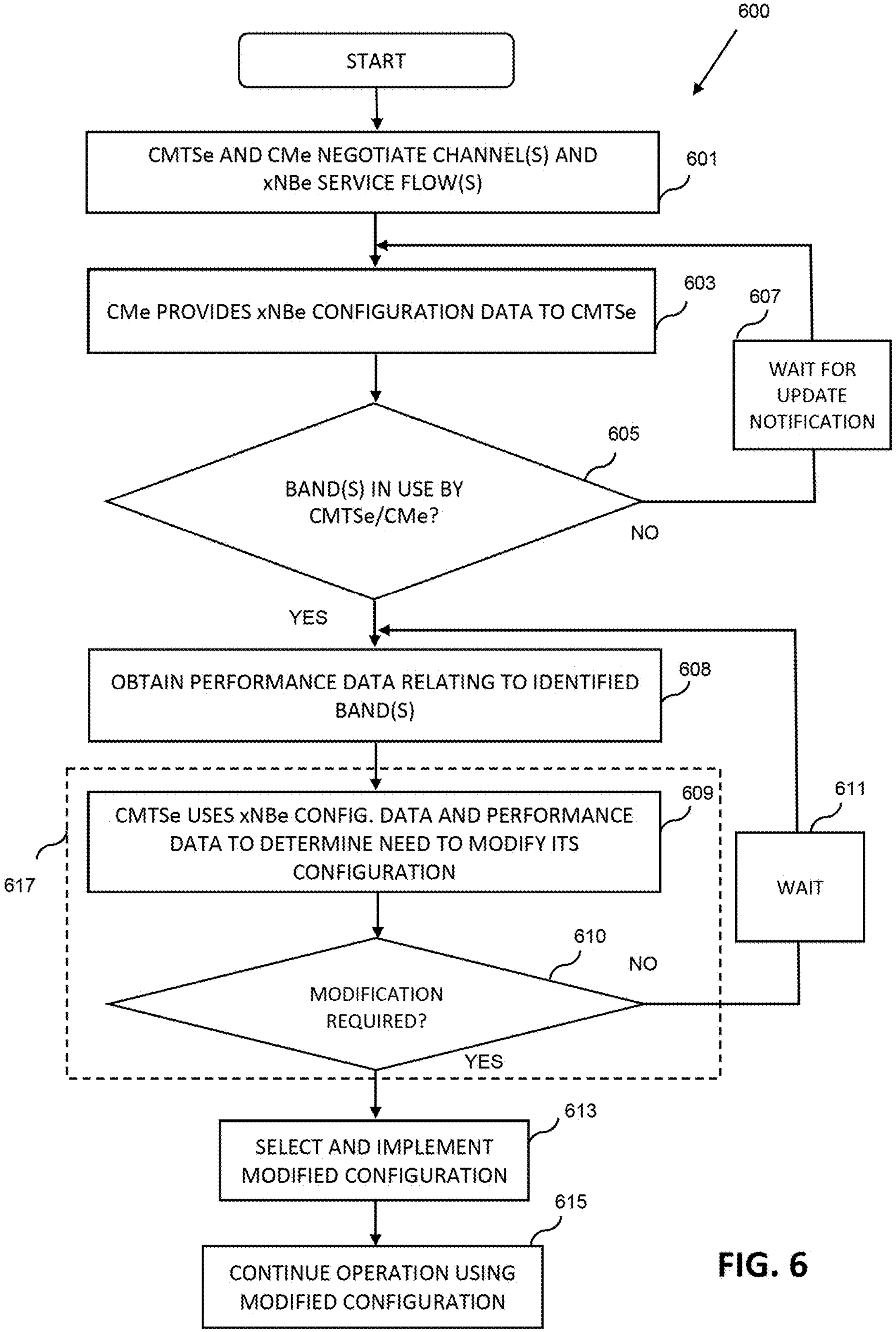
FIG. 6 is a logical flow diagram illustrating one exemplary implementation of the generalized methodology of FIG. 5.

FIG. 6 is a logical flow diagram illustrating one exemplary implementation of the generalized methodology of FIG. 5.

As shown in FIG. 6, the method 600 includes the CMTSe and CMe negotiating the RF channels and associated service flows to be used by the xNBe per step 601. As previously described, this negotiation is generally conducted according to extant DOCSIS protocols; however, in this implementation, the CMSTe is made "aware" that a wireless base station is being served by the CMe (such as using the IP packet header approach described elsewhere herein), such that the CMTSe can differentiate the attached CMe from other non-BS connected CMe, and between two different CMe serving different base stations, as applicable to the particular deployment.

Per step 603, the CMe provides configuration data obtained from the xNBe to the CMTSe, such as via an uplink channel established between the two devices via DOCSIS protocols. The data may be in the form of packets forwarded from the xNBe and addressed to the CMTSe (or a proxy thereof), or those generated by the CMe itself, as previously described.

Responsive thereto, per step 605, the CMTSe extracts the configuration data from the received packets determines whether one or more bands identified within the data are in use (or are in a candidate pool for use) by the CMTSe for communication with the CMe (or other CMe served by the CMTSe), depending on the scope of potential effects. For instance, in one variant, the CMTSe evaluates whether the identified frequencies or band are in use/available for any CMe that it serves. If not, then no further evaluation is required and the CMTSe enters a wait state (step 607) for further notifications (such as changes to frequency utilization) issued from the same or other xNBe devices.

If the band(s) are identified as being in use, then the CMTSe next evaluates whether such use is within the scope of CMe that may feasibly be impacted by the xNBe; see discussion of FIG. 6C below.

Per step 608, the CMTSe then also obtains performance data relating to the identified band(s), specifically for channels in active use on the wireline backhaul. In one approach, the performance data is obtained for the identified (band) irrespective of which CMe is being served by the band. In another approach (per the scoping discussed elsewhere herein), performance data is only obtained for channels being used by CMe which are potentially impacted by the xNBe; i.e., the CMe associated with the original reporting xNBe, and others which may be geographically or topologically proximate to that CMe. Exemplary types of performance data that may be obtained per step 608 are discussed below with respect to FIGS. 6A and 6B.

Per step 609, the CMTSe then utilizes the obtained performance data (and optionally other parts of the configuration data where provided by the xNBe) to determine whether modification to the operation of the CMTSe is required (step 610). For instance, if the evaluation of step 609 yields data indicating that effects of the xNBe operation are minimal or below prescribed criteria, the CMTSe may decide that no action is required. Conversely, if the effects meet or exceed the prescribed criteria, the CMTSe may select and implement a modification (per step 613), such as e.g., moving one or more CMe to new frequency bands/carriers, or altering the configuration of existing channels (such as via a reduction in modulation order, change in FEC parameters, etc.), and continue operation in the modified configuration (step 615). The CMTSe may in some variants cause further evaluation of the affected channel(s) such as via altering operation of the xNBe to verify that it is in fact the source of the interference/effects before making such modifications, as described in greater detail subsequently herein.

Figure 6A:
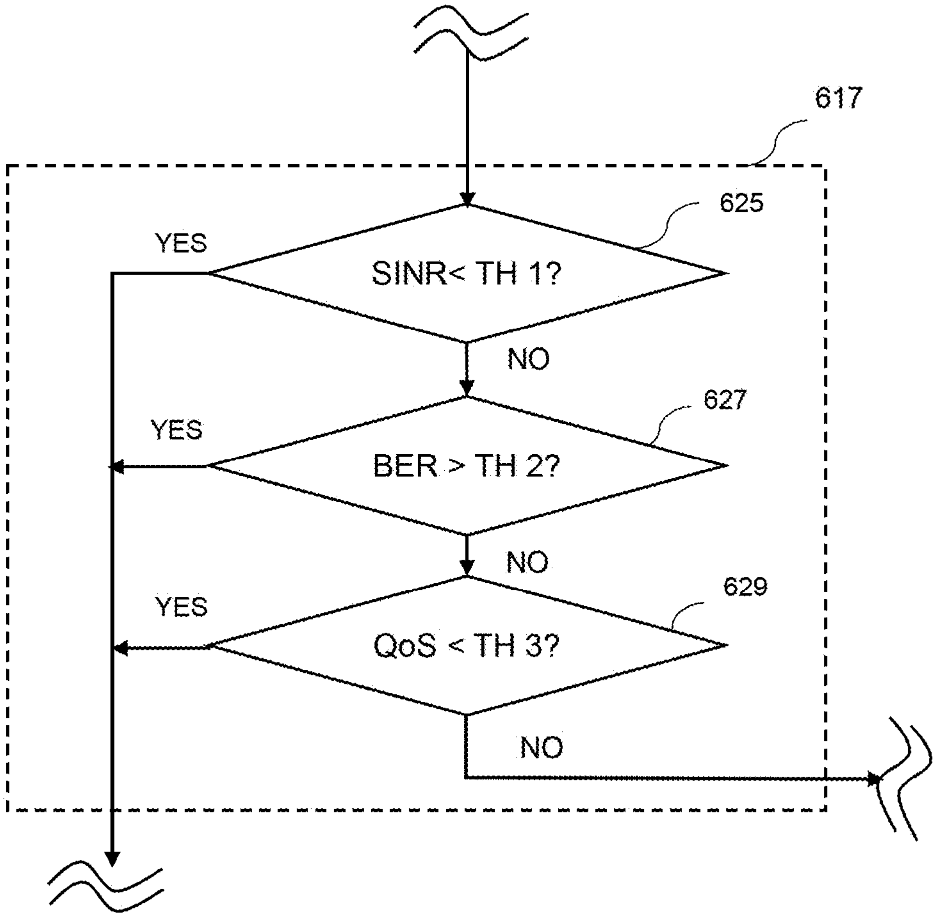
FIG. 6A is a logical flow diagram illustrating one implementation of the CMTSe modification evaluation process of FIG. 6.

FIG. 6A is a logical flow diagram illustrating one implementation of the CMTSe modification evaluation process of FIG. 6. As shown, in this implementation, step 617 of the method 600 of FIG. 6 is configured to evaluate a plurality of parameters relating to one or more selected channels or bands, such as those selected as being within "scope" for possible effects of the target xNBe. In this implementation, three parameters are evaluated: SINR, BER, and QoS (such as via data rate/average data rate, packet loss, transmission delay, and/or jitter), although it will be appreciated that other metrics or parameters may be used alone or in concert with one or more of the foregoing. In the illustrated implementation, the parameters are evaluated sequentially (i.e., the measurement of BER per step 627 is contingent upon SINR measurements in step 625 failing or falling below a prescribed threshold value (TH 1), and QoS measurement per step 629 is contingent on BER and SINR "failing" (i.e., falling above TH 2 and below TH 3 respectively), but this logic can be permuted, as well as altered to be parallel or partly parallel in nature if desired (such as where all three metrics are evaluated irrespective of the others, and the results of each utilized within a weighted relationship which generates an overall "score" for the channel/band evaluation). Yet other approaches will be recognized by those of ordinary skill given the present disclosure, the foregoing being merely exemplary.

Moreover, the thresholds (TH 1-3) or criteria used for determining pass/fail may be more complex in nature (as opposed to a discrete value or set of values). For instance, the QoS criteria of step 629 may be comprised of several discrete thresholds (e.g., one for packet loss rate, one for data throughput (avg.) rate, etc.) which are themselves combined, such as via a weighted equation which generates a unitary result. Each of the foregoing criteria or parameters may also be statistical in nature, including based on prior data obtained for that channel (such as via a prior evaluation conducted by the CMTSe).

Figure 6B:
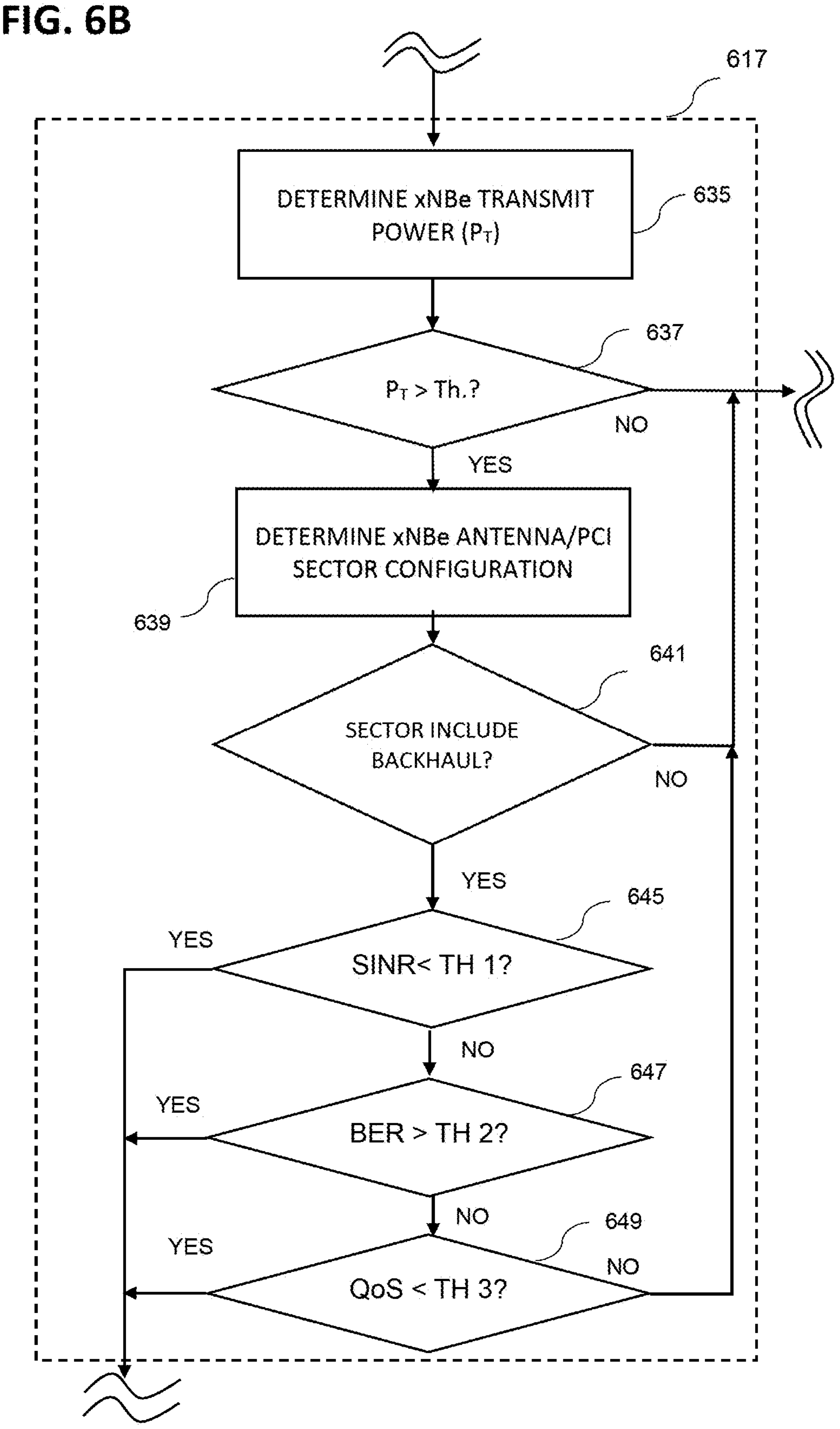
FIG. 6B is a logical flow diagram illustrating another implementation of the CMTSe modification evaluation process of FIG. 6.

FIG. 6B is a logical flow diagram illustrating another implementation of the CMTSe modification evaluation process of FIG. 6. In this implementation, step 617 of the method 600 first determines the target xNBe maximum transmit power (PT) per step 635. This may for example may be a value for EIRP in dbm or mW or other such measure. This data may be obtained from the xNBe itself (such as via the configuration data), or another entity such as a network process tasked with managing such xNBe data, including an entity such as an SAE (spectrum allocation entity).

Next, per step 637, the power value is compared to a prescribed threshold value. In one variant, the threshold value is determined a priori based on e.g., modeling or other data indicative of levels of interference associated with certain operational scenarios. For instance, based on modeling and field testing, it may be known that maximum EIRP values below 23 dbm may pose little if any interference or degradation risk to cable DOCSIS bands, even when the transmitter is immediately proximate the backhauling cable/CMe. In one variant, this "risk" is quantified as being within the error-correcting (e.g., FEC) capabilities of the wireline receiver (i.e., at below 23 dbm, there is very low probability (e.g., based on BER) that the FEC capabilities could not correct errors introduced by the external interference.

This approach in effect establishes a gating criteria for further evaluation; if the gate is not met, there is presumed to be no further evaluation or adaptation needed. That being said, other implementations of the present disclosure contemplate more gradated approaches such as where depending on the power value determined, different courses of evaluation (and potential modification) may be selectively implemented by the CMTSe.

Moreover, the foregoing analysis may be performed on an actual versus maximum power basis. While a given xNBe may be authorized to transmit up to say 20 dbm, it may only actually use a much lower power (e.g., all of its constituent UE or FWA devices are nearby), and hence pose no actual (versus putative) risk of significant interference.

Per step 639, when the determined maximum/actual power exceeds the prescribed threshold, the CMTSe may also determine the antenna sector/PCI configuration of the xNBe for the band(s) of interest. For example, if the xNBe is authorized to a maximum power of 20 dbm only within a given azimuth/sector corresponding to a given PCI (physical cell identifier), that data may be useful in determining that little or no risk of interference exists, such as where the permitted sector is oriented away from the backhaul CMe or cable. As a stark example, an xNBe installed on a rooftop or building façade may utilize one sector which is pointed up and away from the CMe and cable in the building below, such that any (primary) transmissions will likely have minimal effect on the CMe/cable. As with the frequency and other data, this sector/PCI configuration data may be obtained by the CMTSe from the configuration data sent by the xNBe, and/or from other sources (whether in total or piecemeal).

Per step 641, if the sector data indicates potential interference with the backhaul (e.g., wherein the cable/CMe is subsumed within the active sector), then the methodology of FIG. 6A (steps 645, 647 and 649) are then applied as previously described, as shown in FIG. 6B. In one variant, determination of whether the cable/CMe is/are within a given sector may be determined at installation of the xNBe/CMe (e.g., by a qualified technician), or alternatively in another approach via a post-installation "training" routine executed by the CMTSe and the xNBe where so equipped. For example, in one configuration, the CMTSe may send data packets (e.g., IP packets) addressed to a port or socket associated with the xNBe which cause the xNBe to implement a training routine, such as activating/deactivating sectors (and/or adjusting their transmit power levels) sequentially which a prescribed data pattern is transmitted, in order to assess whether the transmissions of a given sector do in fact impact the cable/CMe. One or more parameters associated with the DS channel carrying the packets between the CMTSe and xNBe (via the CMe) such as PER/BER, SINR, etc. can be measured under the energized/de-energized conditions, so as to inform the CMTSe of the sector impact on channel quality. Again, it may be that a given sector even operating at its maximum power may have little effect on a given cable/CMe installation despite being within the coverage azimuth of the sector.

Figure 6C:
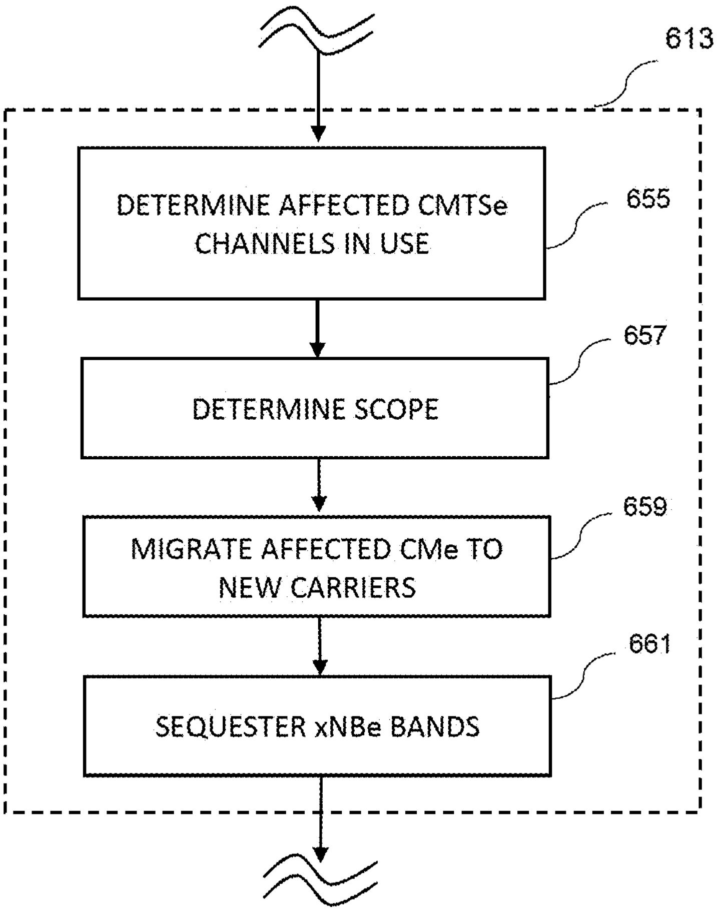
FIG. 6C is a logical flow diagram illustrating one implementation of the CMTSe modification configuration process of FIG. 6.

FIG. 6C is a logical flow diagram illustrating one implementation of the CMTSe modification configuration process of FIG. 6. In this implementation, step 613 of the method 600 of FIG. 6 is implemented by first determining one or more affected CMTSe channels in use (or within an available pool) per step 655. For example, if the results of the prior processes of the method 600 indicate that a modification to the existing channel utilization or other configuration parameter is required, the process of step 655 may be configured to identify specific channels or portions of bands in use that are affected. In the foregoing Band 71 example (FIG. 3A), if the xNBe is operating between 617 and 652 MHz on the DL, and the CMTSe is utilizing say one or more OFDM carriers/channels within that range (whether for the CMe backhauling the xNBe, and/or others), the CMTSe identifies those carriers/channels as being potentially within scope for modification.

Next, per step 657, the scope is determined. In this context, "scope" refers to how many/which devices (e.g., CMe) may be impacted by the target xNBe's operation within the identified band(s). For instance, it may be that in a densely populated area/premises such as an MDU (e.g., apartment), enterprise campus, etc., a given xNBe may potentially interfere with other cable drops/CMe (other than the one used for backhauling the xNBe itself). As such, better user experience and performance can ostensibly be obtained by migrating any of those affected CMe in scope off of the designated band(s), and to other bands without such interference (whether currently or proactively, such as by removing the band(s) from a pool of allocable resources), as in step 659.

In one variant, the scope is determined topologically, such as where certain CMe are part of a common physical service group (i.e., their cable strands originate from a common tap-off or node point on the network, thereby indicating at least some level of physical proximity), or where the service addresses of the various CMe meet a common criteria (such as all being located within a given enterprise/campus or MDU), again indicating at least some level of physical proximity. Scope may also be actively determined, such as where a putative subset of affected CMe are each evaluated when running the target xNBe through the previously described training routine. For instance, all CMe within a given MDU potentially impacted by a given target xNBe can be evaluated for channel conditions/quality while the target xNBe is "cycled" through the training routine in order to identify correlations (whether on an anecdotal or statistical basis) between operation of the target xNBe and interference occurring for any given CMe within the subset.

Per step 661, the identified bands may be sequestered from further use, such as for (i) a prescribed period of time (including for instance until an update indicating that the xNBe is no longer using the band(s) is received by the CMTSe); (ii) for any of the prescribed CMe "in scope"; and/or (iii) for certain types of applications, such as those requiring very high QoS, throughput, etc.

Figure 7:
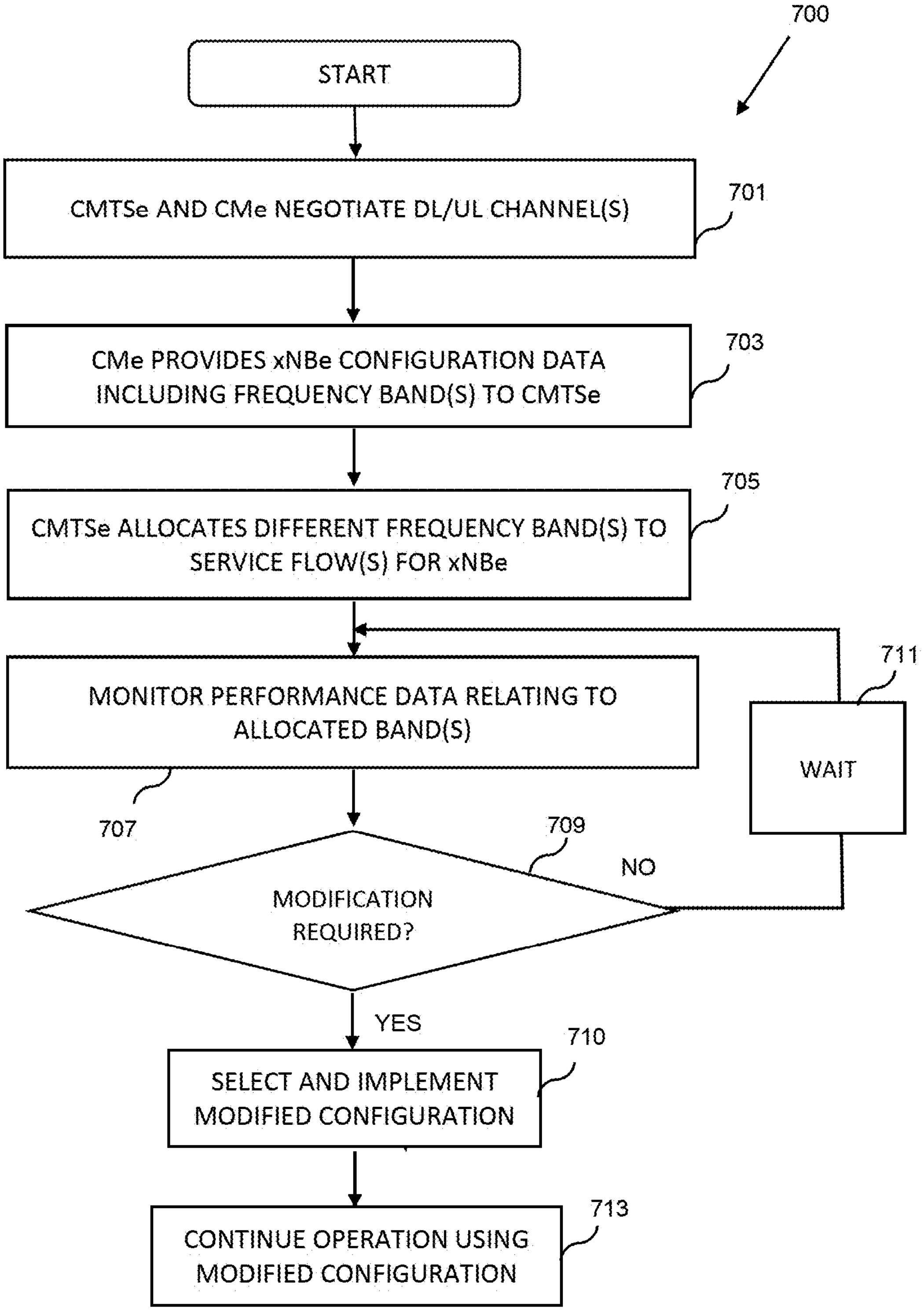
FIG. 7 is a logical flow diagram illustrating another exemplary implementation of the generalized methodology of FIG. 5.

FIG. 7 is a logical flow diagram illustrating another exemplary implementation of the generalized methodology of FIG. 5. In this implementation, the scope of potential impact of a given target xNBe is already known or assumed, such as in the case where the xnBe and its associated CMe are physically distant from others, such as in a rural service setting. As a brief aside, Band 71 and other lower-frequency spectrum offer as one advantage greater physical propagation of transmitted signals and penetration in materials such as buildings as compared to higher frequencies such as those in the 1.8-2.5 GHz or other bands. While their data rate may be lower, they are well suited to use in e.g., rural applications. In such applications, properties may consist of larger tracts of land, and/or may be spread out further from one another (lower customer density per square mile), and as such there is significantly less opportunity for interference as compared to say the aforementioned enterprise or MDU. Accordingly the methodology 700 of FIG. 7 is adapted to presume a priori that no other CMe or devices are within scope, thereby streamlining the CMTSe adaptation algorithms. It will be appreciated, however, that these simplified algorithms/methods may be used in other applications, including the foregoing urban, MDU or enterprise/campus applications where desired, and are not in any way limited to rural or other similar applications.

As shown in FIG. 7, the method 700 includes the CMTSe and CMe negotiating the RF channels and associated service flows to be used by the xNBe per step 701. As previously described, this negotiation is generally conducted according to extant DOCSIS protocols; however, in this implementation, the CMSTe is made "aware" that a wireless base station is being served by the CMe (such as using the IP packet header approach described elsewhere herein), such that the CMTSe can differentiate the attached CMe from other non-BS connected CMe.

Per step 703, the CMe provides configuration data obtained from the xNBe to the CMTSe, such as via an uplink channel established between the two devices via DOCSIS protocols. The data may be in the form of packets forwarded from the xNBe and addressed to the CMTSe (or a proxy thereof), or those generated by the CMe itself, as previously described.

Responsive thereto, per step 705, the CMTSe allocates one or more different frequency bands to be used by the serving CMe, such as for supporting DL service flows for the CMe (and xNBe). In this context, the term "different" means for example that the newly allocated bands have at least some difference from the bands identified by the xNBe as being used for wireless transmission. In effect, the CMTSe logic here simply moves any existing or incipient band allocations to the CMe to a "safe" band which has little or no possibility of interference by the xNBe when the latter is transmitting. This "immediate avoidance" approach is acceptable for instance where there is a low density of usage of the given CMTSe; i.e., it is not heavily crowded such that it can afford to immediately migrate affected CMe (as opposed to first determining whether such migration is really necessary).

Per step 707, the CMTSe then monitors the migrated channel(s) such as by obtaining performance data as previously described. In one approach, the performance data is obtained only for the new (target) CMe wireline band allocated. Per step 711, if no (or acceptable) performance degradation is noted via such monitoring, the algorithm enters a wait state 711 and continues monitoring for channel degradation. If, however, further modification is required per step 709, the CMTSe selects a modification and implements such changes (step 710), and continues operation thereunder per step 713. Further monitoring may be conducted after step 713 (and likewise for step 615 of the method of FIG. 6) if desired, such that more incremental modification regimes may be used. For instance, a first-tier modification after detecting interference may include reducing the modulation order, type, changing FEC, etc. for the affected channel, whereas a second-tier or follow-on modification might include another migration to a yet more distant (frequency-wise) carrier. The initial migration of step 705 might for instance be a small (frequency-wise) change in one or more carriers, so as to avoid "stranding" or time/frequency resources and hence bandwidth; i.e., maintaining the frequency allocations as compact as possible. If such initial migration does not suitably address interference (as detected per step 707), then subsequent migrations of greater difference may be used.

It will be recognized by those of ordinary skill given this disclosure that the foregoing methods may also be implemented in a more dynamic fashion, including for certain prescribed periods of time only, or under certain types of operational conditions. As but one example, the xNBe DL (transmit) function and the CMTSe DL (DS) channelization represent arguably the most critical factors in evaluation and adaptation by the CMTSe. Under FDD, the DL channel for e.g., Band 71 is 617-652 MHZ, and as such is expected to be the primary "interferer" to the CMTSe when the xNBe is conducting Band 71 operations with one or more UE/FWA. Hence, the CMTSe in some embodiments can utilize statistical approaches to scheduling its allocations within such band, e.g., such that on a statistical basis, only a prescribed probability of allocation of CMe DS service flow to a bearer within that band is experienced; i.e., in the aggregate, interference is kept low, albeit with occasional interference.

As another example, the CMTSe may be aware of historical patterns of usage, such as where Band 71 communications by the xNBe typically occur only during certain hours of the day, days of the week, etc. As such, the probability of an interfering "event" is higher during such windows, and the CMTSe can adaptively schedule its allocations in order to achieve a prescribed probability.

The CMSTe and xNBe logic (described in greater detail below) may also have varying levels of connectivity and communication so as to enable such dynamic allocation of wireline spectrum.

For instance, in one variant, a UE invoking synchronization and RACH (and attachment) procedures causes logic within the xNBe to generate a "warning" to the CMTSe of incipient operation within one or more known bands. In one such approach, the CMTSe has received the configuration file/data of the xNBe associated with a given CMe, and maintains data on the frequencies used by the xNBe (e.g., the Band 71 DL and UL frequencies of FIG. 3A). This data may also be supplemented if desired with "confidence" or probability data, such as based on whether the given xNBe has ever strayed to operate outside such band(s). Hence, when no UE/FWA are in RRC_Connected or RRC_Idle state with the xNBe, the CMTSe can presumptively use all Band 71 frequencies on its wireline interface (at very least for that individual CMe). However, when a warning communication is received from the xNBe pursuant to an attachment by a UE/FWA, the CMTSe may preemptively migrate the CMe (or others) from those bands in anticipation of interference from the xNBe transmitter during DL operations. Likewise, when UE/FWA detach from the xNBe, the CMTSe may reclaim such bands for its own use.

In yet another variant, the CMTSe may include logic which enables it to communicate with a plurality of different xNBe devices at different premises (such as via IP-layer packets transmitted from one application process to another) in order to coordinate operations of two or more xNBe in terms of frequency/interference. For example, it may be that two xNBe operating autonomously may operate at frequencies which are not optimal from the CMTSe point of view, such as where they unduly preempt a wide swath of spectrum on the cable medium. By coordinating these two xNBe DL Tx frequencies to be closer to one another (assuming sufficient wireless spectrum is available), a smaller slice of preempted spectrum on the cable may result.

Network Architectures—

Figure 8:
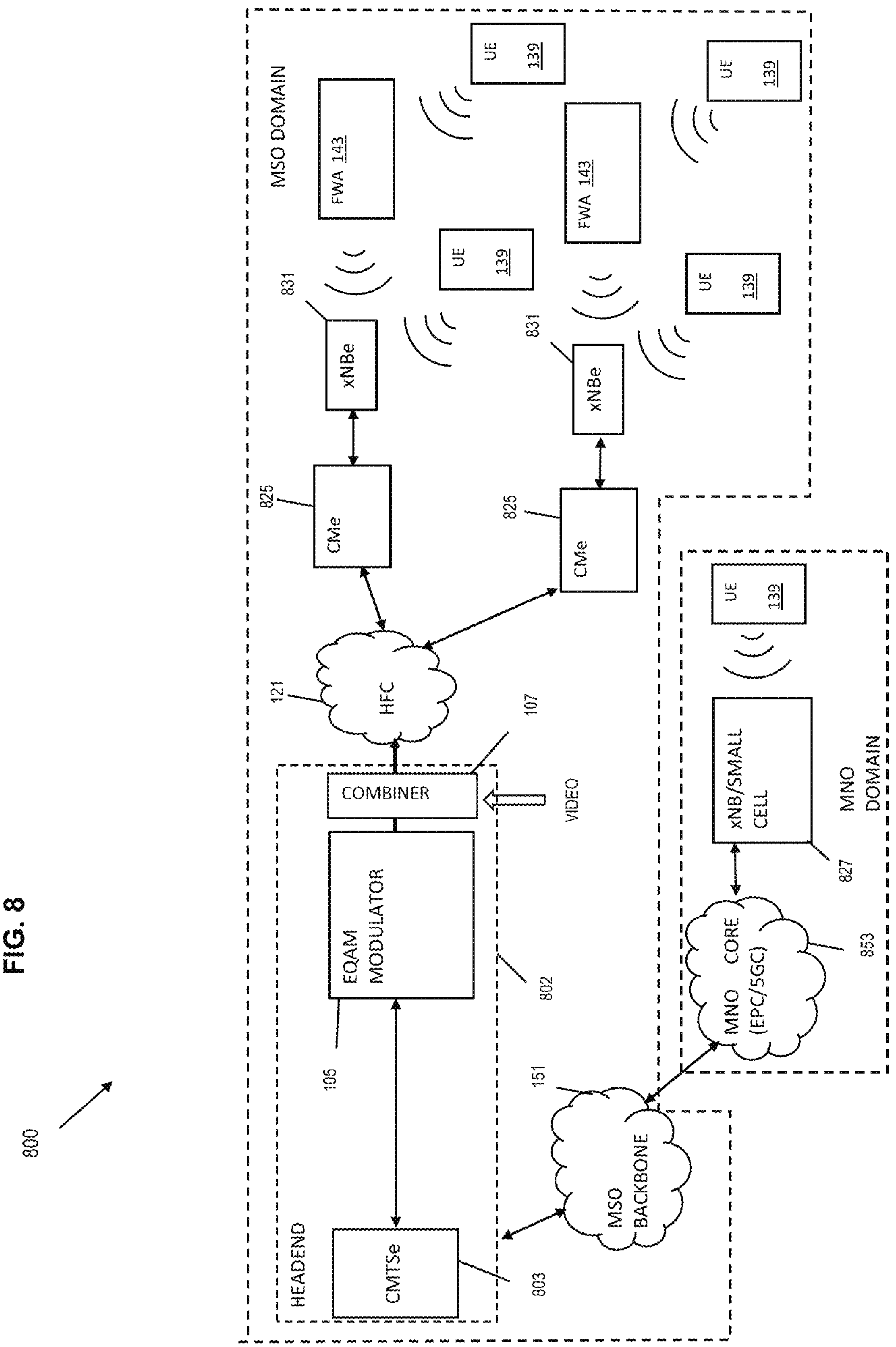
FIG. 8 is a block diagram illustrating one exemplary embodiment of network configuration with enhanced base station communication and frequency adaptation functionality according to the present disclosure.

FIG. 8 is a block diagram illustrating one exemplary embodiment of network configuration with enhanced base station communication and frequency coordination functionality according to the present disclosure.

As a brief aside, the so-called modular headend architecture (MHA; see e.g. CableLabs Technical Report CM-TR-MHA-V02-081209, which is incorporated herein by reference in its entirety) essentially separates the downstream PHY layer out of the CMTS, and move it to a separate EQAM device. In this architecture, the CMTS transmits data to the EQAM via the Downstream External PHY Interface (DEPI). This architecture was introduced in order to reuse EQAM to modulate both the data bits as MPEG video bits. The upstream receiver is kept in the CMTS in the MHA.

In contrast, another architecture used in implementing headend platforms is the Converged Cable Access Platform (CCAP). In order to increase efficiency, the CCAP integrates the EQAM and CMTS into one platform. In addition, in the CCAP, all the downstream traffic, including DOCSIS and video QAMs are transmitted in a single port. The CCAP unifies the CMTS, switching, routing, and QAM modulator in one unit, so that all data and video are converted in IP packets before conversion to RF signals.

The Remote PHY technology, also known as Modular Headend Architecture Version 2 (MHAV2), removes the PHY from the CMTS/CCAP platform and places it in a separate access point that is interconnected with an IP network. One common location to place the remote PHY is the optical node that is located at the junction of the fiber and coax cable networks.

In the MHAV2 architecture, the CCAP includes two separate components, CCAP core and the Remote PHY Device (RPD). The CCAP core contains a CMTS core for DOCSIS, and an EQAM core for video. The CMTS core contains the DOCSIS MAC, upper layer DOCSIS protocols, all signaling functions, downstream and upstream scheduling. The EQAM core processes all the video processing. Similarly, an RMD (generally analogous to the RPD, but containing the DOCSIS MAC, also colloquially referred to a s a "Flex MAC") is also specified; see e.g., CableLabs Technical Report CM-TR-R-MACPHY-V01-150730, which is incorporated herein by reference in its entirety.

The RPD/RMD processes all the PHY related function, such as downstream QAM modulators, upstream QAM demodulators, upstream coders, downstream decoders, filtering, time and frequency synchronization, as well as the logic to connect to the CCAP core. One motivation for using such approaches as RPD/RMD is the ability to obviate analog fiber components between the headend and optical nodes, and rather utilize digital optical PHY and interfaces thereby enhancing quality at the nodes.

Hence, it will be appreciated by one of ordinary skill given the present disclosure that the exemplary network architectures described below with respect to FIGS. 8 and 9 (discussed below) may be readily adapted to any of the foregoing models or paradigms (e.g., MHA, MHAv2, etc.), and yet other configurations are possible, those of FIGS. 6 and 7 being merely non-limiting examples.

Referring again to FIG. 8, a functional block diagram illustrating a first exemplary configuration of an HFC network architecture apparatus according to the present disclosure is shown, with enhanced CMTS (CMTSe) and EQAMs located at a cable system headend 802. This embodiment leverages existing architectures which utilize a headend-based CMTS and EQAM, yet with further expansion of CMTS capabilities. Specifically, as described in detail subsequently herein, the enhanced CMTSe 803 shown includes additional logic which supports base station service flow establishment and frequency evaluation and adaptation/modification functions, as well as others described herein. It will be appreciated that the various aspects of the disclosure may be implemented such that some aspects of the CMTSe 803 is not required; i.e., a CMTSe without base station service flow designation capability may be used, such as where a prioritized or dedicated service flow for the base station(s) served by the CMTSe (and associated CMe) is not desired or required.

As shown, the architecture 800 of FIG. 8 includes the CMTSe 803, as well as switch logic that interfaces the CMTSe with one (or more) EQAMs 105. Output of the EQAMs is combined with video and other signals, and the combined (optical domain) signal transmitted downstream via optical fiber to one or more nodes within the HFC topology (not shown in FIG. 8) for ultimate delivery to CMe devices 825 for use by premises CPE (such as e.g., xNBe devices 831, Wi-Fi-enabled routers, PCs, gateways, or other devices) within the served premises. UE 139 and FWA 143 may be served by the xNBe devices at each premises as shown. For instance, in one model, the xNBe 831 is disposed on a building rooftop or facade, and mobile users can access the xNBe via e.g., Band 71 or Band 12-17 spectrum. In another model, the xNBe is a high power device which is used as a wireless backhaul for a number of FWA devices 143 (effectively fixed 3GPP UE that service e.g., residential premises). Many other models are possible.

In the embodiment of FIG. 8, the MSO domain is interfaced with an external MNO domain via the MSO backbone 151, such as where an MNO-operated EPC/5GC 853 which also services MNO cells (cellular xNBs) and small cells 827 is the cognizant core for the MSO domain users.

Figure 9:
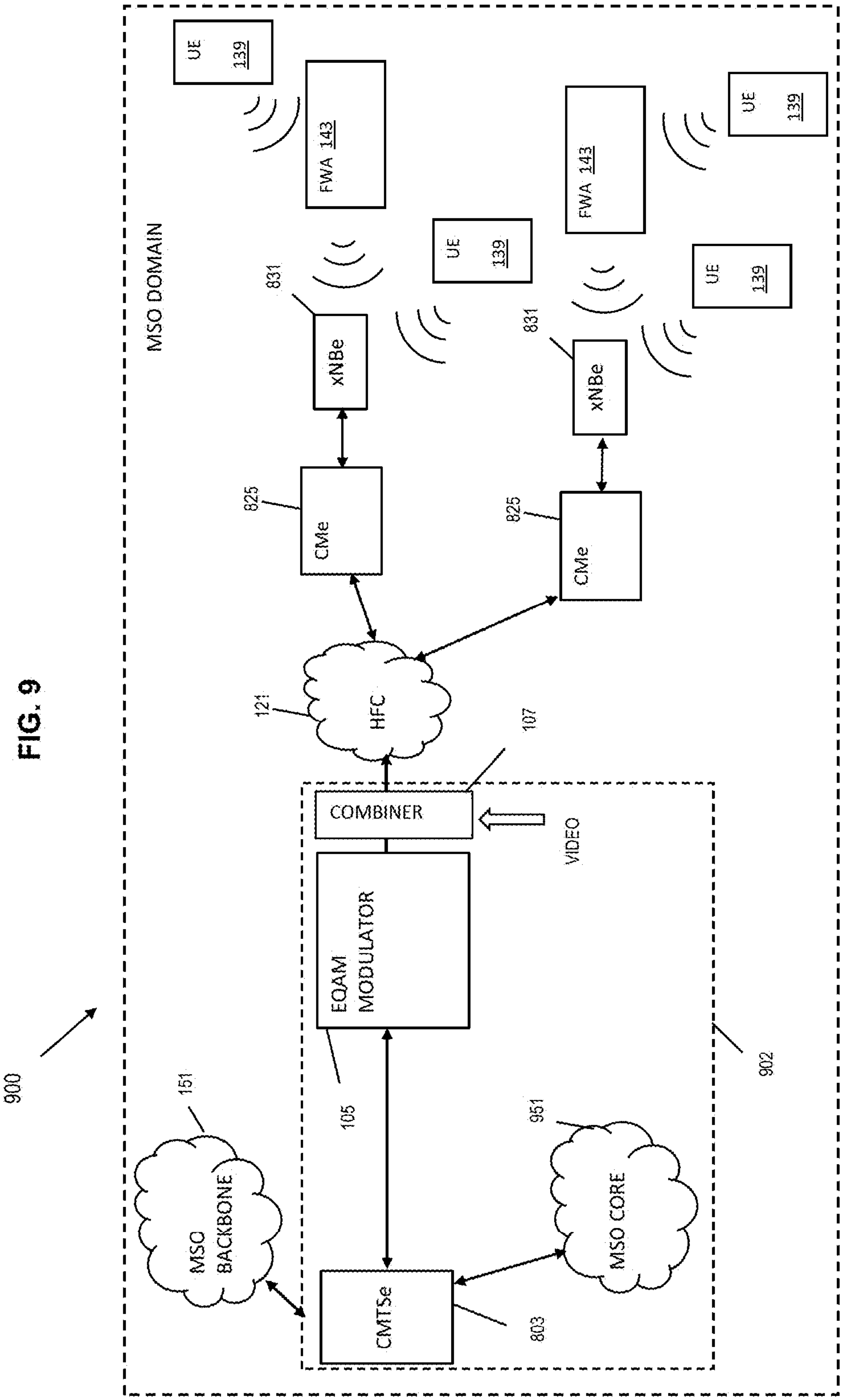
FIG. 9 is a block diagram illustrating another exemplary embodiment of network configuration with enhanced base station communication and frequency adaptation functionality according to the present disclosure.

FIG. 9 is a functional block diagram illustrating a second exemplary configuration of an HFC network architecture apparatus according to the present disclosure, with enhanced CMTS (CMTSe) 803 co-located (at least topologically) with an MSO-based core 951. In this model, the MSO domain contains all necessary components for e.g., UE attach procedures and packet session establishment, and any MNO based networks and their EPC/5GC infrastructure (not shown) are considered external. In that the UE's 139 are associated with MSO subscriber premises and subscriptions, and the core infrastructure is part of this "home" network, significant economies can be realized, as well as reduced latencies associated with network attachment and session management, since the MSO maintains control of all relevant processes (including timing delays which may otherwise be induced by external operator's equipment over which the MSO has no control).

In contrast, in the embodiment of FIG. 8 previously discussed, the architecture 800 is divided among two or more entities, such as an MNO and an MSO. As shown, the MSO service domain extends only to the xNBe and served premises and the MSO core functions, while other functions such as 3GPP EPC/E-UTRAN or 5GC and NG-RAN functionality is provided by one or more MNO networks operated by MNOs with which the MSO has a service agreement.

In some embodiments, the architectures shown above may also include an MSO-managed and operated VOIP server which acts in effect as an equivalent of the 3GPP core for "cellular" calls; the server manages user/device authentication, call routing, etc. roughly analogous to the more sophisticated 3GPP procedures, and may likewise include timing and latency requirements, including for user plane data so as to avoid call "jerkiness" or temporal artifact during VoIP calls. It will be recognized that a 3GPP UE 139 might also have a VoiP stack operative thereon, such that the UE can utilize the VoIP server (not shown) via an established IP session (whether via a Wi-Fi connection to an AP which is backhauled by the CMe, or via a 3GPP NR-U or CBRS session conducted via the xNBe). To this end, the present disclosure envisions that other types of access devices with stringent timing or other requirements may be configured similar to the xNBe described in greater detail below. For instance, a Wi-Fi 802.11ax ("6") AP may be enhanced with IP packet marking capability such that a VOIP call conducted using a user's PC or laptop with microphone and headset is "prioritized" in one manner or another, whether at the network/control plane or user data plane, by congested CMe/CMTSe, such as during an emergency 911 call, such that any necessary migration by the CMTSe of wireline carriers or bands so as to avoid upstream degradation is preemptively addressed. As a simple example, if an xNBe conducts UE attach procedures with a VoIP enabled UE or FWA, these procedures may be used to trigger the CMTSe to migrate any service flows associated with the CMe serving the xNBe to new frequencies such that call quality/QoS is not adversely impacted by the xNBe transmissions interfering with the common-frequency wireline channel(s) carrying the VoIP packets to/from the backhauling CMe.

It will be appreciated that while the embodiments of FIGS. 8 and 9 illustrate generally discrete components (e.g., xNBe, CMe, etc.), various ones of the functions associated with these components can be abstracted out and disposed in other devices. For instance, in one such variant (not shown), the xNBe(s) may include a common or "master" baseband processing capability which is not part of the xNBe form factor disposed downstream of each respective CMe. The xNBe in such cases operates basically as an RF front-end, with baseband processing performed in a distributed fashion for each of the different xNBe devices by a common "baseband processor" device disposed e.g., further upstream, such as at an upstream node which is commonly in communication with each of the served premises (and their respective xNBe) via the respective CMe. Layer 2/3 processes may for example be abstracted out for such common or distributed processing. Many other such alternate hardware configurations will be recognized by those of ordinary skill given the present disclosure.

CMTSe Apparatus

Figure 10:
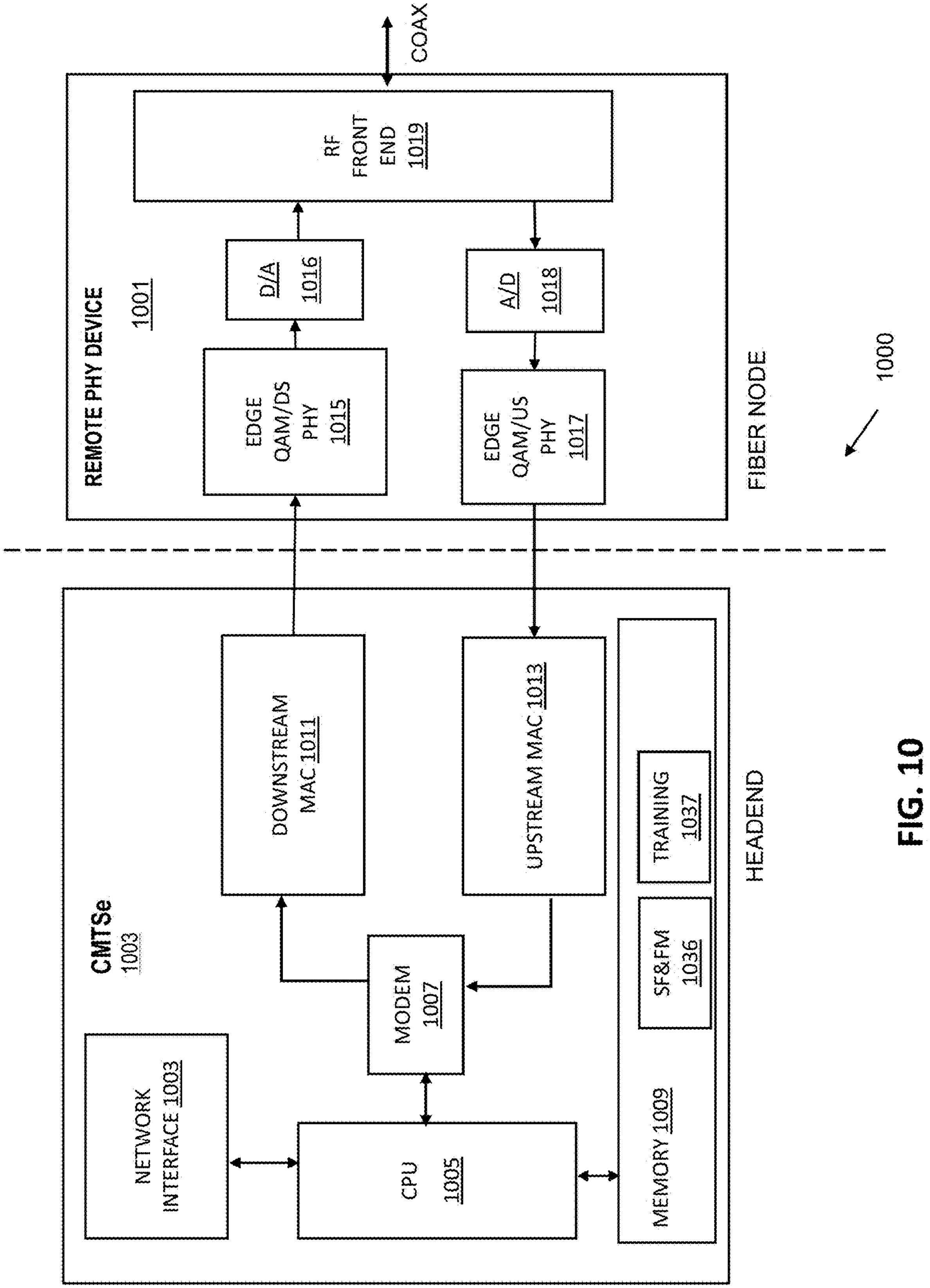
FIG. 10 is a block diagram illustrating one exemplary embodiment of network converged headend and remote PHY device (RPD) configuration with enhanced CMTS and communication/throughput functionality according to the present disclosure.

FIG. 10 is a block diagram illustrating one exemplary embodiment of network converged headend and remote PHY device (RPD) architecture 1000 with enhanced CMTS and frequency adaptation functionality according to the present disclosure. In the Remote PHY (R-PHY) architecture, which is a distributed access architecture, the PHY layer is moved from CMTSe (headend) to the fiber nodes within the HFC network. By decreasing the distance to client device, the R-PHY can achieve higher bandwidth and throughput than a modular or integrated CCAP architecture, and hence it can provide higher bandwidth and throughput. It will be appreciated however that non RPD/RMD based variants may be used as well consistent with the present disclosure, such as via the modular CCAP or integrated CCAP architectures. In such architectures, the PHY and MAC layers are implemented in the headend.

As illustrated, the architecture 1000 includes one CMTSe module 803 physically located at the headend, and one or more R-PHY modules physically located at fiber nodes. The CMTSe device 803 includes a processor 1005, modem 1007 (which may be integrated in the CPU 805, or implemented as a separate processor or ASIC as shown), RF front end 1019, downstream MAC 1011, upstream MAC 1013, upstream PHY 1017, RF front end 1018, memory 1009, and service flow and frequency management (SF & FM) logic 1036 and training coordination logic 1037, each integrated in memory module 1009. Additionally, the exemplary embodiment 1000 includes a network interface 1003 that interfaces CMTSe 803 to connect to a data network (e.g., MSO backbone and/or other network as described in FIGS. 8-9).

The components of the CMTSe device 1003 shown in FIG. 10 may be individually or partially implemented in software, firmware or hardware.

In the exemplary embodiment, the processor(s) 1005, 1007 may include one or more of a digital signal processor, microprocessor, field-programmable gate array, GPU, or plurality of processing components mounted on one or more substrates. The processor may also comprise an internal cache memory, and is in communication with a memory subsystem 809, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor(s) 1005, 1007.

The downstream MAC 1011 adds overhead (e.g., MAC address, Automatic Repeat request (ARQ)) to data, and divides the date stream into MAC frames. Likewise, an US MAC 1013 is provided for data traffic sent from e.g., the CMe(s).

The SF & FM logic 1036, among other functions, identifies the transmitted packets from the xNBe 831 (via the CMe 825) where so implemented, reads the header fields to determine the packet type (e.g., BS associated), and allocates the required service flows and resources to the serving CMe. Also, depending on the type of the received packet from the CMe, the CMTSe 803 may prioritize the various service flows, and also may extract data from the packets relating to xNBe configuration. As described previously, in one embodiment, the data identified as associated with the xNBe (such as by IP packet header inspection) can be allocated to an xNBe-specific service flow established between the CMTSe and CMe, although this is not a requirement of practicing the various other aspects of the invention.

In the RPD, the Edge QAM/Downstream PHY module 1015 receives the MAC data from the module 10811, adds redundancy (e.g., Forward Error Control Coding (FEC)) to the data, and converts the data to PHY layer data and video signals (e.g., 16-QAM, 256-QAM). The D/A device 1016 converts the digital received signal from module 1015, and converts it to analog signal to be converted to RF signals by RF front end unit 1019. The A/D module 1018 receives the analog baseband signals from RF front end unit 1019, and converts it to digital signal. The upstream PHY module 1017 converts the received base baseband signal constellation to data bits. The data bits from PHY module 1017 are divided in MAC frames by upstream MAC module 1013, and decoded by modem IM 1007.

The RF front end 1019 includes RF circuits to operate in e.g. DOCSIS 3.1 or 4.0 supported frequency spectrum (5-42 MHz upstream, 43-366 MHz VOD, SVD, broadcast channels, 367-750 MHz, 751 MHz-1.2 GHz downstream). The modem 1007 generates the upstream and downstream PHY/MACH control and data, timing, and synchronization signals. The CPU 805 is the main processing component in the CMTSe device 803; it generates the signal to control other components in the CMTSe 803 and the network (including the various CMe to which it is connected), fetches and stores data from memory 1009, and generates the signals and commands for the network interface 1003.

Base Station Apparatus—

Figure 11:
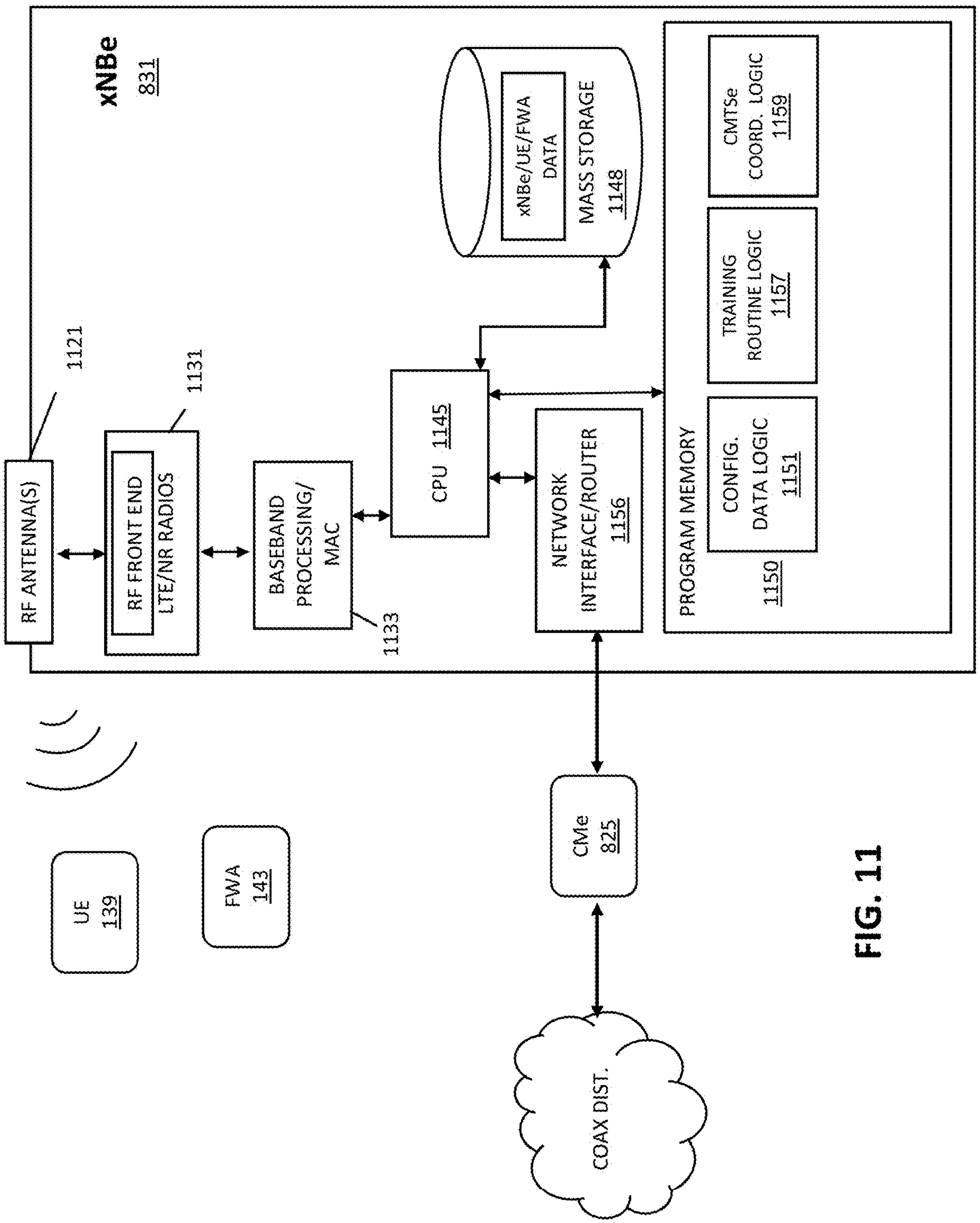
FIG. 11 is a block diagram illustrating one exemplary embodiment of base station (e.g., xNBe) apparatus configured for provision of enhanced communication and frequency adaptation functions according to the present disclosure.

FIG. 11 is a block diagram illustrating one exemplary embodiment of base station (e.g., xNBe) apparatus configured for provision of enhanced connectivity according to the present disclosure.

As shown, the xNBe 831 includes, inter alia, a processor apparatus or subsystem 1145, a program memory module 1150, mass storage 1148, one or more network interfaces 1156, as well as one or more radio frequency (RF) devices 1131 having, inter alia, antenna (e) 1121 and one or more 4G/5G radio(s).

At a high level, the xNBe maintains a 3GPP-compliant LTE/LTE-A/5G NR "stack" (acting as a E-UTRAN eNB or 5G gNB) communications with 3GPP-compliant UEs (mobile devices 139), as well as any other protocols which may be required for use of the designated frequency bands such as e.g., Band 71.

As illustrated, the xNBe device 831 includes configuration data logic 1151, training routine logic 1157, and CMTSe coordination logic 1159.

The configuration data logic 1151 includes a variety of functions including assembly of configuration data relating to the xNBe for transmission to the CMTSe 803 via the CMe 825 as previously described. xNBe identifier data may also be generated an processed by the logic 1151. In this latter process, the configuration logic 1151 adds a base station "identifier" or other designator in the IP packet header that denotes the packet type and the base station identity (either generically or specifically as desired). In some embodiments, the logic 1151 may be configured to add additional marking or identifiers to certain packets, so as to e.g., associate them with a particular function or service flow established within the CMe. Alternatively, the logic 1151 may simply address certain packets to certain sockets or ports within the CMe.

The training routine logic 1157 and CMTSe coordination logic 1159, where utilized, perform respective training routine and CMTSe coordination functions, such as those described previously herein with respect to FIGS. 5-7. For example, the xNBe may be configured to receive commands from the CMTSe (via the logic 1157) and implement one or more tasks or routines which help the CMTSe evaluate the xNBe (and CMe), and/or other devices, for possible interference created by the xNBe. The CMTse coordination logic 1159 in one implementation includes logic which enables coordination between the CMTSe and xNBe, such as for the "warning" functions previously described, or other status indicators.

In the exemplary embodiment, the processor 1145 may include one or more of a digital signal processor, microprocessor, field-programmable gate array, GPU or plurality of processing components mounted on one or more substrates. The processor 1105 may also comprise an internal cache memory, and is in communication with a memory subsystem 1150, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 1121 are configured to detect and transceive signals from radio access technologies (RATs) in the service area or venue with which the xNBe 831 is associated. For example, LTE (including, e.g., LTE, LTE-A, LTE-U, LTE-LAA) signals may be used as the basis of communication between the xNBe 831 and the various mobile devices (e.g., UEs 139) or FWA 143. The antenna(s) 1121 may include multiple spatially diverse individual elements in e.g., a MIMO- or MISO-type configuration, such that spatial diversity of the transceived signals can be utilized for e.g., increase in coverage area.

In the exemplary embodiment, the radio interface(s) 1131 comprise one or more LTE/5G-based radios compliant with 3GPP. Additional unlicensed, licensed, or quasi-licensed air interfaces may also be used within the xNBe, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and quasi/unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The RF radios 1131 in one embodiment comprises a digitally controlled RF tuner capable of reception of signals via the RF front end (receive chain) of the RF radio(s) in the aforementioned bands, including in one variant simultaneous reception (e.g., both 2.300 to 2.500 and 600 to 800 MHz bands at the same time, or Band 71 and Band 12/17 in another configuration).

Figure 11A:
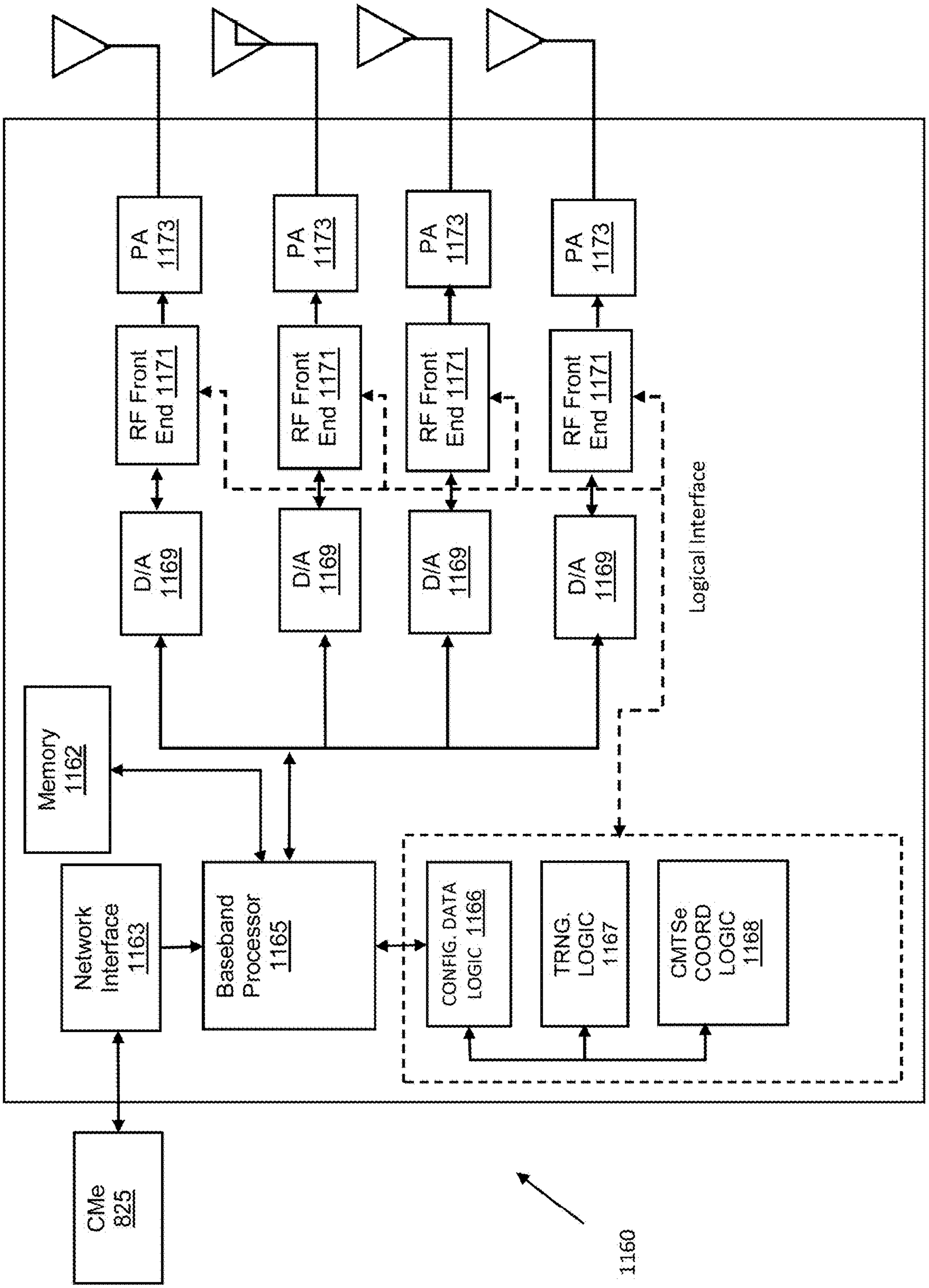
FIG. 11A is a block diagram illustrating one exemplary implementation of the base station (e.g., xNBe) of FIG. 11, illustrating different antenna and transmit/receive chains thereof.

FIG. 11A is a functional block diagrams illustrating an exemplary implementation of the xNBe 831 of FIG. 11.

As illustrated, the device 1160 includes baseband processor 1165, one or more D/A 1169, one or more RF front ends 1171, one or more power amplifiers 1173, configuration data logic 1166, training logic 1167, and CMTSe coordination logic 1168. Additionally, the exemplary embodiment includes a network interface 1163 that interfaces the xNBe to connect to a data network via e.g., a CMe 825.

The components of xNBe 1160 shown in FIG. 11A may be individually or partially implemented in software, firmware or hardware. The RF front end 1171 includes RF circuits to operate in e.g., licensed, quasi-licensed or unlicensed spectrum (e.g., Band 71, Bands 12-17, NR-U, C-Band, etc.) depending on configuration. The digital baseband signals generated by the baseband processor 1105 are converted from digital to analog by D/As 1169. The front-end modules 1113 convert the analog baseband signals radio received from D/As 1169 to RF signals to be transmitted on the antennas. The baseband processor 1165 includes baseband signal processing and radio control functions, including in one variant physical layer and Layer 2 functions such as media access control (MAC). The Power Amplifiers (PA) 1173 receives the RF signal from RF front ends 1111, and amplify the power high enough to compensate for path loss in the propagation environment.

CMe Apparatus—

Figure 12:
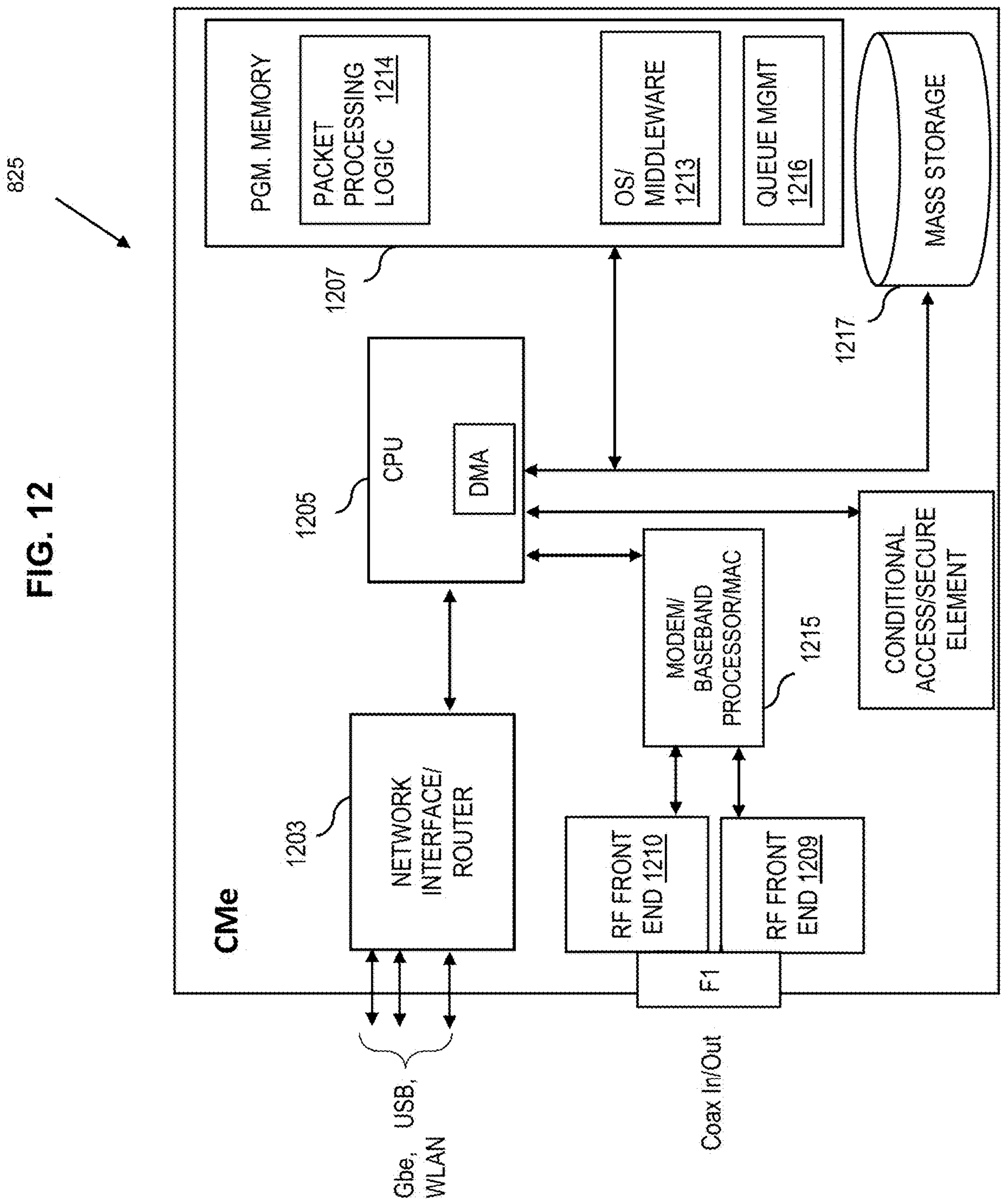
FIG. 12 is a block diagram illustrating one exemplary embodiment of a cable modem (CMe) apparatus configured for provision of enhanced communication and frequency adaptation functions according to the present disclosure.

FIG. 12 is a block diagram illustrating one exemplary embodiment of a cable modem (CMe) apparatus 825 configured for provision of enhanced communication and frequency adaptation functionality according to the present disclosure.

At high level, the CMe apparatus 825 includes, inter alia, a processor apparatus 1205, a program memory module 1207, mass storage 1217, one or more RF front ends 1209, 1210 for processing RF signals received and transmitted over the coaxial "last mile" network, baseband processor/modem chipset 1215, as well as one or more network interfaces 1203 such as, Gigabit Ethernet or other LAN/WLAN connectivity, support of home or premises gateways, DSTBs, 3GPP small cells, etc. within the premises, etc.

The RF modules 1209, 1210 include a heterodyne-based transmitter/receiver architecture generally symmetrical to the transmitter/receiver of the enhanced CMTSe/node discussed previously; i.e., impedance matching circuitry, diplexer, synchronization circuit, tilt, etc. are used as part of the CMe RF front ends, as well as RF tuner apparatus. The RF front ends are used to convert the received signal from frequency bands (366-750 MHz and 750 MHz-1.2 GHz, or to 1.8 GHz for DOCSIS 4.0, or higher for so-called "Extended Spectrum DOCSIS" up to e.g., several GHz) to baseband, and the inverse for transmission. A common F1-type connector for interface between the coaxial network and RF front end(s) is shown, although other approaches may be used as well.

Moreover, while two separate RF front ends 1210, 1209 are shown in this embodiment, a single device covering the entirety of the desired frequency range may be used with generally equal success.

The network interface module 1203 may include for example GbE Ethernet/WLAN/USB ports, which allows interface between the CMe module and premises devices such as xNBe devices 831, WLAN routers, DSTB devices, computers, etc., to support data interchange between the CMe and the device.

In the exemplary embodiment, the host processor (CPU) 1205 may include one or more of a digital signal processor, microprocessor, GPU, field-programmable gate array, or plurality of processing components mounted on one or more substrates. The processor 1205 may also comprise an internal cache memory, and is in communication with a memory subsystem 1207, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1205, including the OS and middleware 1213 (e.g., executing a Linux or other kernel).

The processor 1205 is configured to execute at least one computer program stored in memory 1207 (e.g., a non-transitory computer readable storage medium); in the illustrated embodiment, such programs include logic to implement the prioritized or dedicated service flow management functionality described previously herein (including packet processing logic 1214 for passing xNBe configuration data to the CMTSe, as well as coordinating with CMTSe logic for implementation and utilization of any prioritized service flows if established. Other embodiments may implement such functionality within dedicated hardware, logic, and/or specialized co-processors or ASICs (not shown).

The CMe may also further be configured with queue management (QM) logic 1216, which is used to monitor and maintain service flow queue levels (e.g., for UL data queues where the CMe is equipped to perform upstream data queue metric monitoring/analysis) such as in support of QoS or other parameter evaluations, as previously described herein. For instance, the queue logic may be used to gather data on rising buffer levels, indicative of reduced data rates or throughputs caused by e.g., interference with a DL or UL channel on the wireline interface.

The CMe logic also includes a hierarchy of software layers and communication protocols to enable RF carrier detection, reporting and synchronization, communication with the CMTSe 803, interaction with PHY layer and hardware, routing data from/to the HFC network, Layer 2/3 functions, etc.

Exemplary Communications Flow—

Figure 13A:
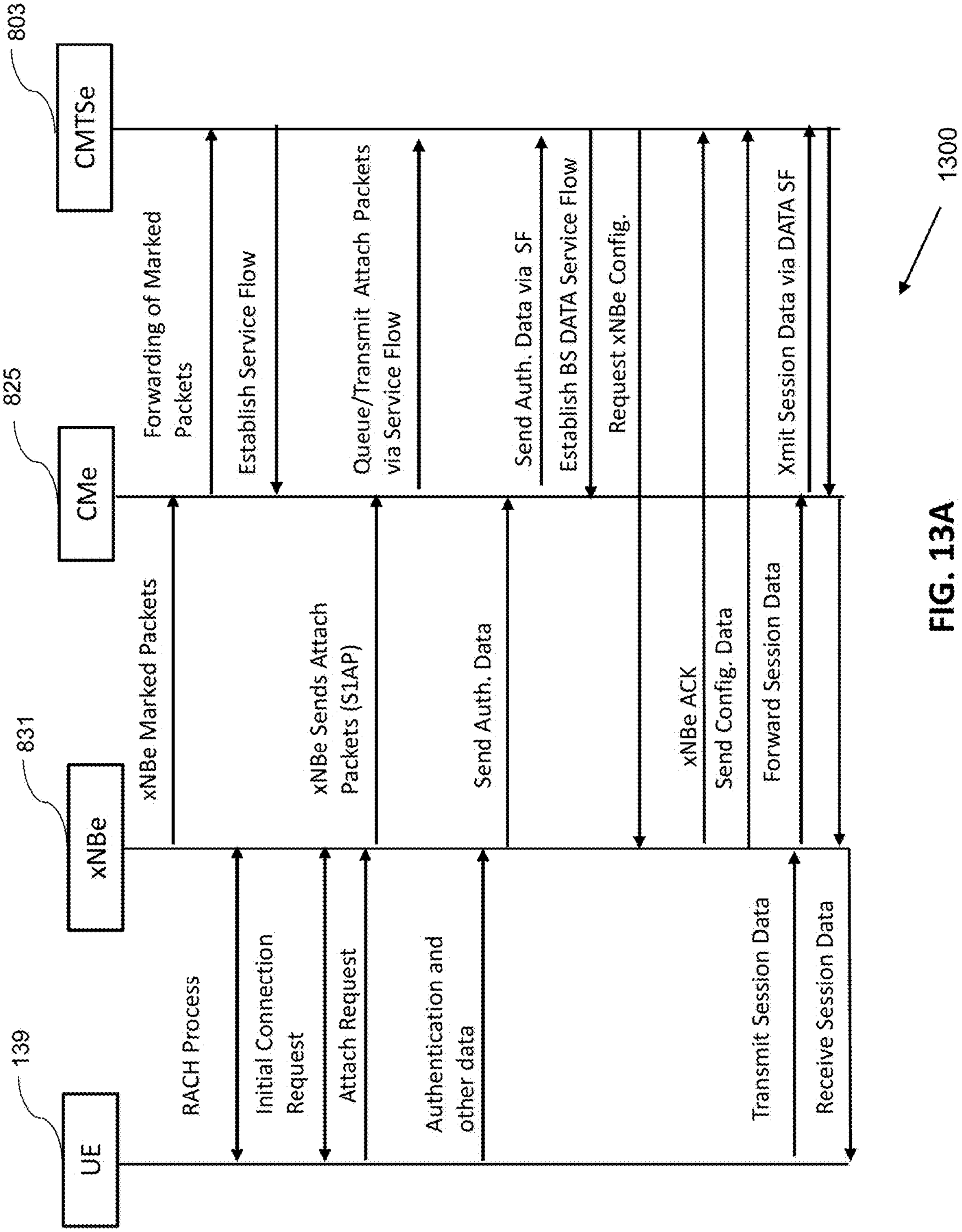
FIGS. 13A-13B are a ladder diagram illustrating communication and data flow between UE, xNBe, CMe, and CMTSe, according to one embodiment of the present disclosure.
Figure 13B:
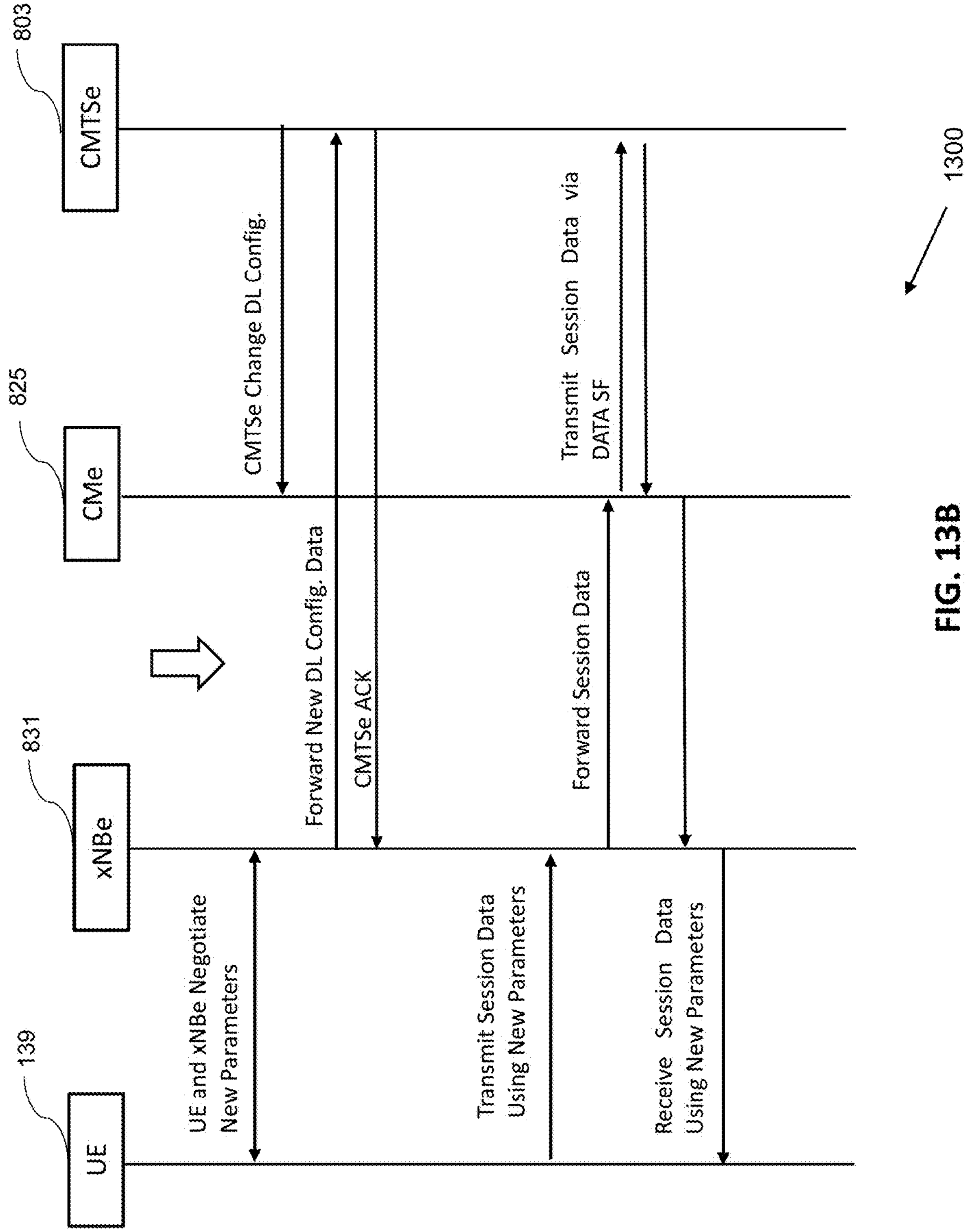

FIGS. 13A-13B are a ladder diagram illustrating communication and flow between UE, xNBe, CMe, and CMTSe according to one embodiment of the present disclosure. In the illustrated ladder diagram of FIG. 13A, a UE first attaches (e.g., synchronization and RACH) and authenticates to the network core via the xNBe and CMe (and CMTSe). Packets sent from the xNBe to the CMe are marked in this embodiment, which enables the CMTSe to establish one or more new service flows dedicated to the xNBe (and its clients), including for session data to be transacted between the UE and e.g., a distant network server, such as via an application executing on the UE. In one approach, the base station has a process operative thereon (e.g., "Packet Manager") that enables designation of packets (e.g., Layer 2 or 3 packets, such as e.g., IP packets) which it frames for upstream transmission so as to enable prioritization of at least portions of the packets transmitted from the base station to the CMTSe via the CMe. In one variant, packets processed by the CBSDe relating to a UE or FWA 3GPP "attach" procedures (i.e., requests to the prevailing wireless core function for authentication and packet session establishment) are prioritized so as to avoid normal DOCSIS upstream "request/grant" processes which can result in failure to attach and dropped sessions, such as when a significant amount of congestion exists within the wireline (DOCSIS) network. The CMTSe has a process operating thereon (e.g., "Service Flow Manager") that supports prioritizing allocation of the resources to the base station(s); e.g., via establishment of one or more base station-specific service flows (i.e., BS_SYN, BS_ATTACH, and BS_DATA). Packets queued in the these service flows are not subject to the normal request/grant procedures, nor typical packet "drop" protocols such as may be utilized with e.g., DOCSIS AQM (Active Queue Management) or the PIE algorithms (RFC 8034). In one implementation, the CBSDe PM process marks upstream packets for transmission to the CMTSe via the packet's IP header. The receiving CMTSe identifies the packets sent from the base station via this designated header (e.g., a field therein), and in response enables a "BS_SYN" service flow for the CMe serving the base station. The BS_SYN service flow allows for prioritization in allocate of resources to packets queued within that service flow. Upon receipt of BS_SYN queued packets (indicating that the CBSDe is attempting attachment for a UE or FWA), the CMTSe enables a BS_ATTACH service flow for the CMe. Once the CMTSe receives messages from the CMe queued in the BS_ATTACH queue, the CMTSe may enable a BS_DATA service flow, and user plane (UP) traffic may use this service flow for the transmission of data in downlink and uplink. In one variant, the CMe monitors the buffers (queues) associated with the prioritized service flows for overflow, and in the case of buffer overflow negotiates with the CMTSe to increase the modulation order to reduce latency.

Once the CMTSe and CMe negotiate the DL (and UL) channels, the configuration data is passed from the xNBe to the CMTSe (via the CMe), which then uses the data as necessary to evaluate and implement and frequency/band usage and necessary modifications to the wireline interface.

Subsequently, if the xNBe changes e.g., the DL configuration (e.g., changes bands of operation, such as going from Band 71 to Band 12, or other) as shown in FIG. 11B, the new configuration data is again passed to the CMTSe by the xNBe via the CMe, such that the CMTSe can evaluate whether further adaptation or modification of the wireline interface is appropriate.

"Extended Spectrum DOCSIS" Variants

It will be appreciated that while current DOCSIS standards extend operation of the wireline interface to frequencies on the order of 1.8 GHz, yet further frequency range expansion is contemplated under Extended Spectrum DOCSIS, including to frequencies on the order of 5 GHz and beyond, subject to physical limitations on the bearer medium (i.e., coaxial cable). As such, a plethora or other licensed, unlicensed, or quasi-licensed technologies such as C-Band, CBRS, and the like may be implicated and hence utilize the methods and apparatus described herein. For example, the Assignee hereof currently deploys CBRS-compliant CBSDs (Citizens Broadband Service Devices) which operate in the 3.550-3.700 GHz range. While such frequencies may or may not interfere with Extended Spectrum DOCSIS system operation to a significant degree (depending on e.g., transmit power, physical proximity, sector, cable type and shielding, etc.), the present disclosure contemplates adaptation of such Extended DOCSIS systems to adapt to and compensate for any interference or reduction in performance as described previously herein.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a packet network infrastructure comprising at least one packet receiver apparatus and at least one packet transmitter apparatus, the computerized method comprising:

obtaining data at the at least one packet receiver apparatus from wireless equipment connected to the at least one packet receiver apparatus, the obtained data comprising data relating to wireless frequency usage by the wireless equipment; and causing data relating to the obtained data to be transmitted to the at least one packet transmitter apparatus, the transmitted data configured to enable the at least one packet transmitter apparatus to perform at least an optimization process with respect to one or more radio frequency (RF) channels utilized by the packet network infrastructure for communication between the at least one packet receiver apparatus and the at least one packet transmitter apparatus;

wherein the data relating to the wireless frequency usage comprises a power value and sector data, and wherein the at least one packet transmitter apparatus compares the power value to a prescribed threshold to establish a gating criterion for selectively implementing the optimization process based at least in part on whether the sector data indicates potential interference.

2. The computerized method of claim 1, wherein the performance of at least the optimization process with respect to the one or more radio frequency (RF) channels comprises an increase in a modulation order of at least one wireline RF channel of the one or more RF channels.

3. The computerized method of claim 1, further comprising:

identifying, at the at least one packet transmitter apparatus, the wireless equipment connected to the at least one packet receiver apparatus; and based at least on the identifying, causing establishment of at least one dedicated service flow between the at least one packet receiver apparatus and the at least one packet transmitter apparatus for use by the wireless equipment or one or more client devices associated therewith.

4. The computerized method of claim 3, wherein the identifying, at the at least one packet transmitter apparatus, of the wireless equipment comprises identifying a wireless base station connected to a cable modem (CM) based at least in inspecting one or more packet headers for packets transmitted to the CM, the one or more packet headers of the transmitted packets having been marked with a prescribed designation by the wireless base station.

5. The computerized method of claim 1, wherein the packet network infrastructure comprises a DOCSIS (data over cable service specification) packet data system, the at least one packet transmitter apparatus comprises a cable modem termination system (CMTS), and the at least one packet receiver apparatus comprises a cable modem (CM).

6. The computerized method of claim 1, wherein:

the transmitted data comprises data indicative of at least one frequency band utilized by the wireless equipment for wireless transmissions and data indicative of at least one azimuth or sector utilized by the wireless equipment for the wireless transmissions using the at least one frequency band;

the packet network infrastructure comprises a hybrid fiber coaxial (HFC) network infrastructure; and the at least one frequency band comprises a frequency band which overlaps with an operating frequency band of the hybrid fiber coaxial (HFC) network infrastructure.

7. The computerized method of claim 6, wherein the performance of the optimization process with respect to the one or more radio frequency (RF) channels utilized by the packet network infrastructure for the communication between the at least one packet receiver apparatus and the at least one packet transmitter apparatus comprises performing, via the at least one packet transmitter apparatus:

evaluation of one or more parameters relating to channel quality for the one or more RF channels; and based at least on the evaluation, causing:

(i) migration of one or more modem apparatus utilizing the one or more RF channels to one or more respective new RF channels; and (ii) modification to a frequency selection algorithm used at least within an OFDM (orthogonal frequency division multiplexing) based transmitter to remove the one or more RF channels from further use at least for a period of time.

8. The computerized method of claim 7, wherein the period of time comprises a period of time until data indicating that the wireless equipment is no longer using the one or more RF channels is received by the at least one packet transmitter apparatus.

9. The computerized method of claim 1, wherein:

the transmitted data comprises data indicative of at least one frequency band utilized by the wireless equipment for wireless transmissions and data indicative of at least one azimuth or sector utilized by the wireless equipment for the wireless transmissions using the at least one frequency band; and the data indicative of the at least one frequency band utilized by the wireless equipment for the wireless transmissions comprises data indicative that the at least one frequency band is within a range of 600-800 MHz, inclusive.

10. The computerized method of claim 1, wherein the transmitted data comprises data packets of the obtained data and appended data added to the data packets by the at least one packet receiver apparatus, the appended data comprising at least one of (i) prioritization or classification data, or (ii) channel statistics or estimation data.

11. A computerized premises apparatus for use in a wireless network, the computerized premises apparatus includes:

at least one wireless interface;

processor apparatus in data communication with the at least one wireless interface;

at least one network backhaul interface; and storage apparatus in data communication with the processor apparatus, the storage apparatus comprising at least one computer program configured to, when executed by the processor apparatus, cause the computerized premises apparatus to:

engage in communication with a network device via the at least one network backhaul interface of the computerized premises apparatus;

determine a data transmission configuration, the data transmission configuration for the transmission of data to one or more client devices using antennas of the computerized premises apparatus;

enable establishment of a wireless connection between the computerized premises apparatus and the one or more client devices; and based at least on a criterion relating to performance or capability, cause alteration of at least one aspect of the data transmission configuration in order to enhance wireline channel quality on a backhaul;

wherein the alteration of the at least one aspect is maintained during continued operation of the computerized premises apparatus while wireline channel performance is monitored, prior to determining whether a further alteration is required; and wherein, during the continued operation with the altered data transmission configuration, the computerized premises apparatus refrains from further alteration of the data transmission configuration until receipt of information indicating whether further alteration is required.

12. The computerized premises apparatus of claim 11, wherein:

the computerized premises apparatus comprises a 3GPP-compliant NodeB (xNB) configured to operate in a licensed frequency band; and the network device includes a DOCSIS 3.1 or DOCSIS 4.0 compliant modem.

13. The computerized premises apparatus of claim 11, wherein the at least one computer program is further configured to, when executed by the processor apparatus, cause the computerized premises apparatus to:

perform at least on of: (i) activation or deactivation of one or more sectors, or (ii) adjust transmit power levels associated with the one or more sectors, to assess whether transmissions of a given sector impact the wireline channel quality on the backhaul.

14. The computerized premises apparatus of claim 11, wherein the causation of the alteration of the at least one aspect of the computerized premises apparatus comprises transmission of first data to a cable modem termination system (CMTS) via the network device, the first data enabling the CMTS to perform an optimization process with respect to one or more RF bands associated with the network device that interfere with, or cause degradation to, the wireline channel quality on the backhaul.

15. The computerized premises apparatus of claim 11, wherein the causation of the alteration of the at least one aspect of the computerized premises apparatus comprises implement, by the computerized premises apparatus, of a temporary suspension or modification of at least one aspect of an operation of the computerized premises apparatus in coordination with the network device so as to enable the network device to assess an effect of the operation of the computerized premises apparatus on the wireline channel quality on the backhaul.

16. The computerized premises apparatus of claim 11, wherein the causation of the alteration of the at least one aspect of the computerized premises apparatus comprises migration of at least one wireline radio frequency channel used for communications between the network device and a cable modem termination system (CMTS) to a new frequency band so as to mitigate interference with at least one carrier frequency used by the computerized premises apparatus.

17. A computerized method of operating at least one packet transmitter apparatus of a packet network infrastructure that is in communication with at least one packet receiver apparatus, the computerized method comprising:

obtaining, at the at least one packet transmitter apparatus, data relating to wireless frequency usage by wireless equipment connected to the at least one packet receiver apparatus, the data comprising a power value;

comparing, by the at least one packet transmitter apparatus, the power value to a prescribed threshold to establish a gating criterion;

based on the gating criterion being met, determining, by the at least one packet transmitter apparatus and based on configuration data sent by the wireless equipment and/or one or more other sources, an antenna sector/PCI configuration associated with the wireless equipment; and based at least in part on whether the antenna sector/PCI configuration indicates potential interference, selectively implementing, by the at least one packet transmitter apparatus, at least an optimization process with respect to one or more radio frequency (RF) channels utilized by the packet network infrastructure for communication between the at least one packet receiver apparatus and the at least one packet transmitter apparatus.

18. The computerized method of claim 17, wherein:

the antenna sector/PCI configuration is associated with one or more RF bands; and the optimization process further comprises reassignment of the at least one packet receiver apparatus from one or more RF channels associated with the one or more RF bands to one or more different RF channels.

19. The computerized method of claim 17, wherein the optimization process further comprises a change in one or more channel parameters of one or more RF channels in an attempt to remediate the potential interference.

20. The computerized method of claim 17, wherein the optimization process comprises a sequestering of at least one RF band associated with the wireless frequency usage by the wireless equipment so as to prevent assignment of the sequestered at least one RF band to other modem apparatus.

* * * * *